(12) United States Patent
Jeong et al.

(10) Patent No.: US 10,088,687 B2
(45) Date of Patent: Oct. 2, 2018

(54) METHOD AND APPARATUS FOR DISPLAYING CONTENT

(71) Applicant: Samsung Electronics Co., Ltd., Gyeonggi-do (KR)

(72) Inventors: Seong-Hun Jeong, Seoul (KR);
Tae-Seon Kim, Seoul (KR);
Min-Young Kim, Gyeonggi-do (KR);
Tae-Kyun Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 26 days.

(21) Appl. No.: 15/013,180

(22) Filed: Feb. 2, 2016

(65) Prior Publication Data

US 2016/0238851 A1    Aug. 18, 2016

(30) Foreign Application Priority Data

Feb. 12, 2015   (KR) .................. 10-2015-0021677

(51) Int. Cl.
| | |
|---|---|
| G02B 27/01 | (2006.01) |
| G06F 3/14 | (2006.01) |
| G02B 27/22 | (2018.01) |
| G06F 3/147 | (2006.01) |
| G09G 3/00 | (2006.01) |
| G06T 3/20 | (2006.01) |
| G06T 3/40 | (2006.01) |

(52) U.S. Cl.
CPC ....... *G02B 27/0179* (2013.01); *G02B 27/017* (2013.01); *G02B 27/0172* (2013.01); *G02B 27/2228* (2013.01); *G06F 3/147* (2013.01); *G06F 3/1431* (2013.01); *G06T 3/20* (2013.01); *G06T 3/40* (2013.01); *G09G 3/003* (2013.01); *G09G 2320/0693* (2013.01); *G09G 2340/0464* (2013.01)

(58) Field of Classification Search
CPC ............. G02B 27/0179; G02B 27/017; G02B 27/0172; G02B 27/2228; G06F 3/1431; G06F 3/147; G06T 3/20; G06T 3/40; G09G 3/003; G09G 2320/0693; G09G 2340/0464
See application file for complete search history.

(56) References Cited

U.S. PATENT DOCUMENTS

| | | | |
|---|---|---|---|
| 2010/0079356 | A1 | 4/2010 | Hoellwarth |
| 2010/0171680 | A1 | 7/2010 | Lapidot et al. |
| 2012/0099013 | A1 | 4/2012 | Lee et al. |
| 2016/0054802 | A1* | 2/2016 | Dickerson ............. G06F 3/0487 345/158 |

OTHER PUBLICATIONS

European Search Report, dated Jun. 27, 2016.

* cited by examiner

*Primary Examiner* — Jwalant Amin
(74) *Attorney, Agent, or Firm* — Cha & Reiter, LLC.

(57) ABSTRACT

An electronic device comprising: a memory; a display unit; a communication unit; and at least one processor operatively coupled to the memory, the display unit, and the communication unit, configured to: output a light pattern by using one or more pixels that are part of the display unit; receive, via the communication unit, one or more signals that are transmitted by a wearable device in response to the light pattern; identify a screen display area corresponding to the wearable device based on respective positions of the one or more pixels and the one or more signals.

13 Claims, 24 Drawing Sheets

METHOD AND APPARATUS FOR DISPLAYING CONTENT

CLAIM OF PRIORITY

This application claims the priority under 35 U.S.C. § 119(a) to Korean Application Serial No. 10-2015-0021677, which was filed in the Korean Intellectual Property Office on Feb. 12, 2015, the entire content of which hereby incorporated by reference.

TECHNICAL FIELD

The present disclosure relates to electronic devices, in general, and more particularly to a method and apparatus for displaying content.

BACKGROUND

Some electronic devices are provided to be worn on a body. Such electronic devices are generally referred to as wearable devices, and various types of wearable devices have been developed. For example, wearable devices have been provided in a head-mounted type (e.g., glasses), a wrist wearable type (e.g., watches or wristbands), a contact lens type, a ring type, a shoe type, or a clothing type so that the wearable devices may be attached to, or detached from, a body or clothing. The wearable devices allow electronic devices to be worn on the body, such as clothes or glasses, to improve the portability and accessibility of the electronic devices.

Among the wearable devices, head-mounted wearable devices, such as an HMD (head-mounted display), have been widely developed. The HMD may provide a see-through type of screen for providing augmented reality (AR), or a see-closed type of screen for providing virtual reality (VR).

The see-through type HMD may provide a screen that has additional information, which can hardly be obtained in the real world, by synthesizing and combining a real world-based screen with virtual objects using the properties of a semi-transparent lens. The HMD in the see-closed type may provide two displays so that content (games, movies, streaming, or broadcast data) received from the outside may be displayed on the separate displays in order to allow the user to concentrate on the content.

SUMMARY

According to aspects of the disclosure, an electronic device is provided comprising: a memory; a display unit; a communication unit; and at least one processor operatively coupled to the memory, the display unit, and the communication unit, configured to: output a light pattern by using one or more pixels that are part of the display unit; receive, via the communication unit, one or more signals that are transmitted by a wearable device in response to the light pattern; identify a screen display area corresponding to the wearable device based on respective positions of the one or more pixels and the one or more signals.

According to aspects of the disclosure, a method is provided comprising: outputting, by an electronic device, a light pattern by using one or more pixels that are part of a display unit; receiving, by the electronic device, one or more signals that are transmitted by a wearable device in response to the light pattern; identifying, by the electronic device, a screen display area corresponding to the wearable device based on respective positions of the one or more pixels and the one or more signals.

According to aspects of the disclosure, an electronic device comprising: a memory; a display unit including a plurality of light-receiving elements; and at least one processor operatively coupled to the memory and the display unit, configured to: transition the electronic device into a screen display mode corresponding to a wearable device; and
identify a screen display area corresponding to the wearable device based on respective positions of one or more light-receiving elements from the plurality that sense light emitted by the wearable device.

According to aspects of the disclosure, a method is provided for use in an electronic device having a display unit provided with a plurality of light receiving elements, the method comprising: transitioning the electronic device into a screen display mode corresponding to a wearable device; sensing light by one or more light-receiving elements from the plurality; and identifying a screen display area corresponding to the wearable device based on respective positions of the one or more light-receiving elements.

According to aspects of the disclosure, a wearable device is provided comprising: a memory; a communication unit; one or more light-receiving elements provided on a side of the wearable device that is arranged to face a display unit of an electronic device; at least one processor operatively coupled to the memory, the communication unit, and the one or more light-receiving elements, configured to: create one or more signals when the one or more light-receiving elements sense light emitted from the display unit of the electronic device; and transmit, via the communication unit, the one or more signals to the electronic device.

According to aspects of the disclosure, a wearable device is provided comprising: a memory; one or more light-emitting elements provided on a side of the wearable device that is arranged to face a display unit of an electronic device; and at least one processor operatively coupled to the memory and the one or more light-emitting elements, configured to output a light pattern by the one or more light-emitting elements in response to detecting that the electronic device is mounted on the wearable device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
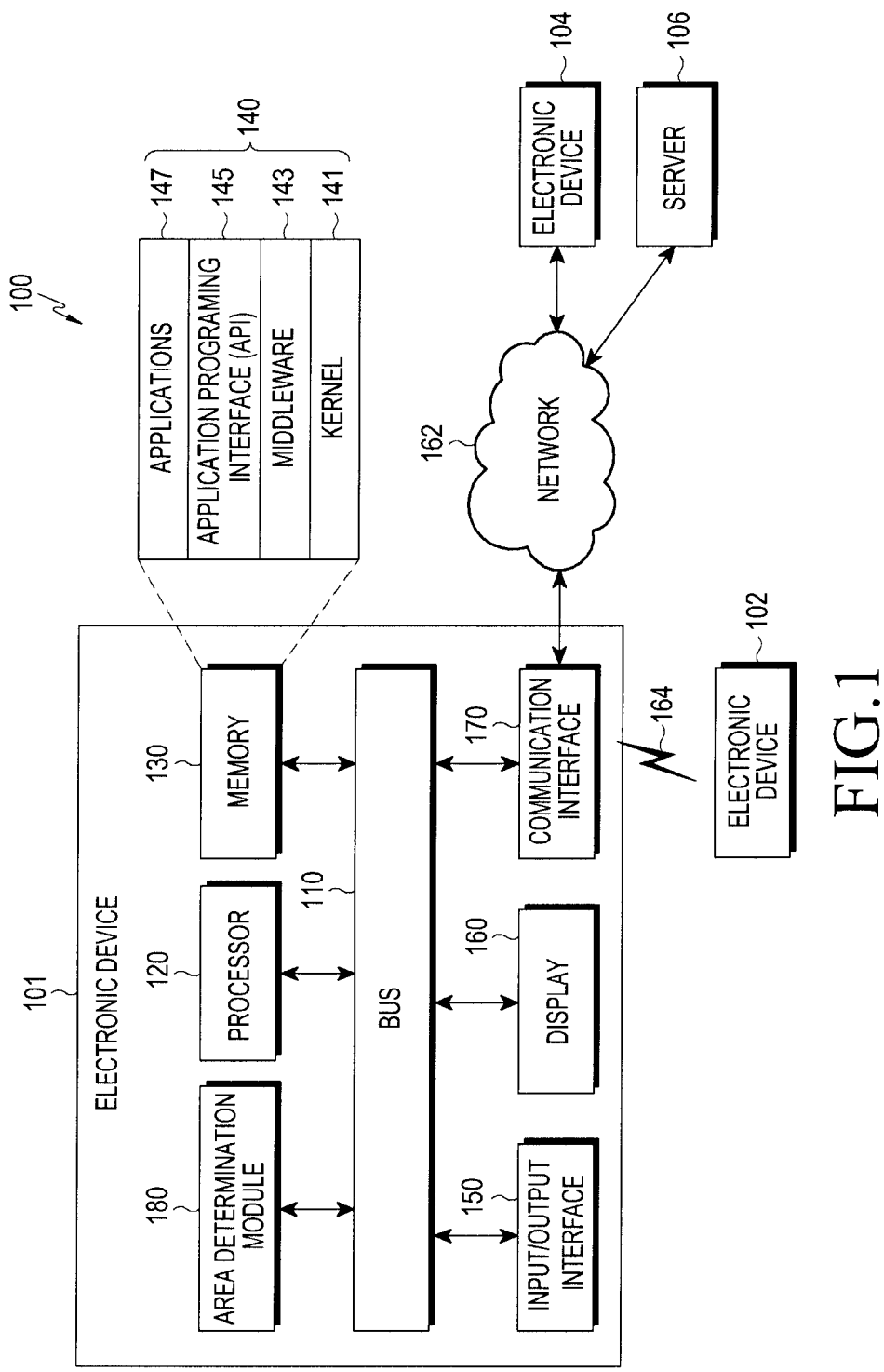
FIG. 1 is a diagram of an example of a network environment, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to the existence of a corresponding feature (e.g., numerical value, function, operation, or components such as elements), and does not exclude the existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C"

may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Referring to FIG. 1, an electronic device 101 in a network environment 100 is shown, according to various embodiments of the present disclosure. The electronic device 101 may include at least one of a bus 110, a processor 120, a memory 130, an input/output interface 150, a display 160, a communication interface 170, or an area determination module 180. In some cases, the electronic device 101 may exclude at least one of the elements above, or may further include other elements.

The bus 110 may be a circuit for connecting elements 110 to 180 described above with each other and transferring communication data (e.g., control messages and/or data) between the elements.

The processor 130 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, in some implementations, the processor 120 may include at least one of a central processing unit (CPU), an application processor (AP), or a communication processor (CP). The processor 120, for example, may perform a calculation or data processing regarding the control and/or communication of one or more other elements of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130, for example, may store instructions or data related to one or more other elements of the electronic device 101. According to an embodiment, the memory 130 may store software and/or programs 140. The programs 140, for example, may include a kernel 141, middleware 143, an application programming interface (API) 145, and/or application programs (or "applications") 147. At least some of the kernel 141, the middleware 143, or the API 145 may be referred to as an operating system (OS).

The kernel 141 may control or manage system resources (e.g., the bus 110, the processor 120, the memory 130, or the like) that are used in performing operations or functions implemented by other programs (e.g., the middleware 143, the API 145, or the applications 147). In addition, the kernel 141 may provide an interface by which the middleware 143, the API 145, or the applications 147 may access each element of the electronic device 101 for control or management.

The middleware 143, for example, may play an intermediate role between the API 145 or the application programs 147 and the kernel 141 to communicate with each other for the transmission and reception of data. Furthermore, in relation to requests for operation received from the application programs 147, the middleware 143 may control (e.g., scheduling or load-balancing) the requests, for example, by giving priority for using system resources (e.g., the bus 110, the processor 120, or the memory 130) of the electronic device 101 to at least one of the application programs 147.

The API 145, for example, may be an interface by which the applications 147 control functions provided by the kernel 141 or the middleware 143, and it may include, for example, one or more interfaces or functions (e.g., instructions) for file control, window control, screen processing, or text control.

The input/output interface 150, for example, may transfer instructions or data input by the user or external devices to the other elements of the electronic device 101. In addition, the input/output interface 150 may output instructions or data received from the other elements of the electronic device 101 to the user or external devices.

The display 160, for example, may include a liquid crystal display (LCD), a light-emitting diode (LED) display, an organic light-emitting diode (OLED) display, a micro-electro-mechanical system (MEMS) display, or an electronic paper display. The display 160, for example, may display a variety of content (e.g., text, screens, videos, icons, symbols, or the like) to the user. The display 160 may include a touch screen, and, for example, may receive a touch input by using electronic pens or a part of a user's body, a gesture input, a proximity input, or a hovering input.

The communication interface 170, for example, may configure communication between the electronic device 101 and the external device (for example, the first external electronic device 102, the second external electronic device 104, or a server 106). For example, the communication interface 170 may be connected to the network 162 through wireless or wired communication in order to communicate with the external device (e.g., the second external electronic device 104 or the server 106). The first external electronic device 102 or the second external electronic device 104 may be wearable devices or wearable devices to which the electronic device 101 may be mounted.

The wireless communication, for example, may use, as a cellular communication protocol, at least one of, for example, LTE, LTE-A, CDMA, WCDMA, UMTS, WiBro, or GSM. The wired communication, for example, may include at least one of a USB (universal serial bus) an HDMI (high-definition multimedia interface), RS-232 (recommended standard 232), or a POTS (plain old telephone service). The network 162 may include one or more telecommunication networks, such as a computer network (e.g., LAN or WAN), the Internet, or a telephone network.

The first and second external electronic devices 102 and 104 may be the same as or different from the electronic device 101. According to an embodiment, the server 106 may include a group of one or more servers. According to various embodiments, all or some of the operations to be executed in the electronic device 101 may be executed in one or more other electronic devices (e.g., the electronic device 102 or 104, or the server 106). According to an embodiment, when the electronic device 101 is required to execute a certain function or service automatically or according to a request, the electronic device 101 may make a request to the other devices (e.g., the electronic device 102 or 104, or the server 106) for the execution of the function or service, additionally, together with at least some of the functions related thereto, instead of executing the function or service by itself. The other electronic devices (e.g., the electronic devices 102 and 104, or the server 106) may execute the requested function or additional function, and may transmit the result thereof to the electronic device 101. The electronic device 101 may additionally process the received result to then provide the requested function or service. To this end, for example, cloud computing, distributed computing, or client-server computing techniques may be used.

Although the electronic device 101 is illustrated to have the communication interface 170 to communicate with the external electronic device 104 or the server 106 through the network 162, according to various embodiments of the present disclosure, the electronic device 101 may be implemented to operate independently in the electronic device 101 without a separate communication function.

According to an embodiment, the server 106 may perform at least one of the operations (or functions) that are implemented in the electronic device 101 in order to support the operation of the electronic device 101. For example, the server 106 may include an area determination server module (not shown) that supports an area determination module 180 in the electronic device 101. For example, the area determination server module may include one or more elements of the area determination module 180, and may perform at least one of the operations (or functions) that are performed by the area determination module 180, or may act as a proxy.

The area determination module 180 may process at least some of the information obtained from the other elements (e.g., the processor 120, the memory 130, the input/output interface 150, or the communication interface 170), and may provide the same to the user in various ways.

For example, according to various embodiments of the present disclosure, when the electronic device 101 is mounted on the wearable device to operate as a display device, the area determination module 180 may adjust an area or position of a screen that is displayed on the display 160. The details of the area determination module 180 will be provided with reference to FIG. 2 later.

Although the area determination module 180 is illustrated to be separated from the processor 120, at least some of the area determination module 180 may be included in the processor 120 or one or more other modules, or all functions of the area determination module 180 may be implemented to be included in the processor 120 or another processor.

Figure 2:
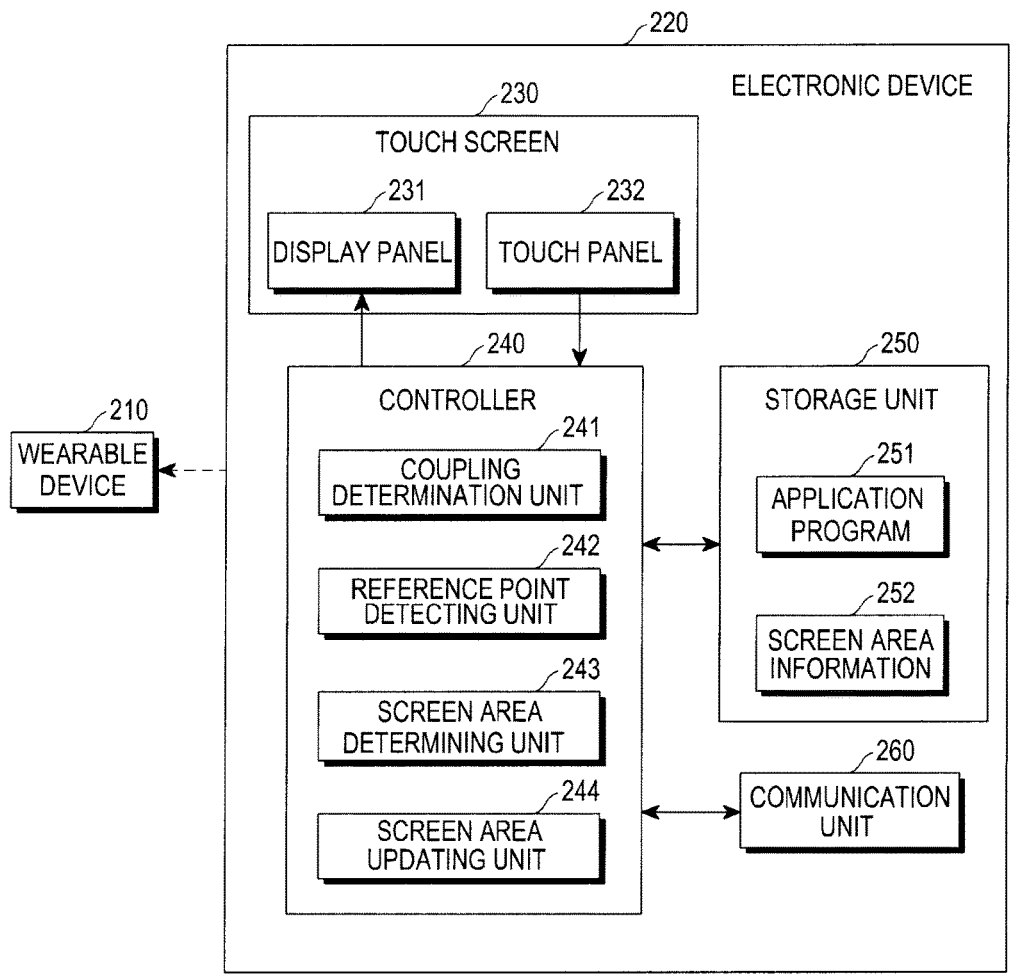
FIG. 2 is a block diagram of an example of an electronic device, according to various embodiments of the present disclosure.

FIG. 2 is a block diagram of an example of an electronic device, according to various embodiments of the present disclosure. Referring to FIG. 2, the electronic device 220, according to various embodiments of the present disclosure, may adopt one or more display means. In the following description, the electronic device 220 may be a device that mainly performs a display function, or may be a normal electronic device that includes one or more display means. For example, the electronic device 220 may be an electronic device (e.g., smart phones) that adopts a touch screen 230.

The electronic device 220, according to various embodiments of the present disclosure, may include at least one of a touch screen 230, a controller 240, a storage unit 250, or a communication unit 260. The touch screen 230 may include a display panel 231 and/or a touch panel 232. The controller 240 may include at least one of a coupling determination unit 241, a reference point detecting unit 242, a screen area determining unit 243, or a screen area updating unit 244.

When the electronic device 220 is mounted on the wearable device 210, the electronic device 220, for example, may operate as the HMD device. According to various embodiments of the present disclosure, the position or size of a screen, which is displayed on the display panel 231 of the electronic device 220, may be adjusted to conform to the user who wears the wearable device 210. For example, when the electronic device 220 is mounted on the wearable device 210 to operate in Head Mounted Theater (HMT) mode, two screens, which correspond to the left eye and the right eye of the user, respectively, may be displayed on the display panel 231 (see FIG. 7).

According to various embodiments of the present disclosure, when the electronic device 220 operates in the HMT mode, the controller 240 may detect reference points by using sensors provided in the wearable device 210 to which the electronic device 220 is mounted, and may determine the position of the screen, which is displayed in the HMT mode, based on the detected reference points.

More specifically, according to various embodiments of the present disclosure, the controller 240 may include at least one of a coupling determination unit 241, a reference point detecting unit 242, a screen area determining unit 243, or a screen area updating unit 244.

According to various embodiments of the present disclosure, when the electronic device 220 is mounted on the wearable device 210 to operate in the HMT mode and a screen display area determining operation is conducted, the controller 240 may control one or more pixels among a plurality of pixels, which are provided in the display panel 231, to emit light according to a predetermined pattern.

In response to the light-emitting of the one or more pixels, one or more light-receiving elements (for example, photodiodes), which are provided on the front side of the wearable device 210 to which the electronic device 220 is mounted, may sense the light emitted from the corresponding pixels, and may transmit to the electronic device 220 one or more signals indicating that the light has been sensed.

The communication unit 260 of the electronic device 220 may receive the signals transmitted from the wearable device 210, and may determine the screen display area corresponding to the wearable device, based on the positions of one or more pixels that emit light at the time when the signals are received from the wearable device 210.

The reference point detecting unit 242 may detect reference points in order to determine the screen display area, based on the positions of one or more pixels that emit light at the time when the signals are received from the wearable device 210.

The screen area determining unit 243 may determine the screen position (e.g., the left screen position screen corresponding to the left eye, and the right screen position corresponding to the right eye), which is to be displayed according to the HMT mode, from the detected reference points. According to various embodiments of the present disclosure, the size of the screen display area may also be determined in addition to determining the screen display area's position.

The HMT mode operation of the electronic device 220 may be determined by the user's execution for the HMT mode or by the coupling determination unit 241. For example, when the electronic device 220 is mounted on the wearable device 210, the coupling determination unit 241 may detect that the electronic device 220 has been mounted on the wearable device 210, and may transition the electronic device 220 into the HMT mode.

In addition, according to various embodiments, the coupling determination unit 241 may determine that the electronic device 220 has not been properly mounted on the wearable device 210 based on the detection result of the reference point detecting unit 242, and may provide to the user an indication to this effect via sound, vibration, or image. For example, as a result of the position determination of the reference point detecting unit 242, if it is determined that the electronic device 220 has not been properly mounted on the wearable device 220 and that the screen may not be normally displayed to the user, the screen position may not be determined, and a notification stating that the electronic device has not been properly mounted may be provided to the user.

Screen area information 252 that is determined by the screen area determining unit 243 may be stored in the storage unit 250. The screen area information 252 may be separately stored for each user in the storage unit 250, and when the user of the electronic device 220 is changed, the screen area information for the changed user may be retrieved and applied to the screen display. In addition, the screen area information 252 may be stored to be separated according to the type of electronic device 220 or the type of wearable device 210.

The storage unit 250 may store the application program 251, and the application program 251 may be related to the HMT mode operation of the electronic device 220. For example, according to various embodiments of the present disclosure, when the user executes the application program 251 related to the HMT mode operation, the reference points may be detected by the reference point detecting unit 242.

The wearable device 210 may be a certain electronic device that can perform one or more functions of the electronic device 101 of FIG. 1, or may be a wearable holder that holds the electronic device 220. In instances in which the wearable device 210 is the electronic device, if the electronic device 220 is mounted on the wearable device 210, various functions may be provided through the communication unit 260 of the electronic device 220. For example, when the electronic device 220 is mounted on the wearable device 210, the electronic device 220 may sense the coupling thereof to the wearable device 210 through the communication with the wearable device 210, and may determine whether or not to transition into the HMT mode.

According to various embodiments of the present disclosure, when the electronic device 220 is mounted on the wearable device 210, if the coupling of the electronic device 220 cannot be automatically determined, the user may manually transition the electronic device 220 to the HMT mode. In addition, according to various embodiments of the present disclosure, if the wearable device 210 includes the functions of the electronic device 101, the coupling determination unit 241 of the electronic device 220 may automatically determine the coupling to the wearable device 210 and then automatically switch to the HMT mode.

When the electronic device 220 operates in the HMT mode while being mounted on the wearable device 210, the screen area updating unit 244 may re-determine the screen display position according to the HMT mode through the detection of the reference points with respect to the wearable device 210 at a predetermined time interval, in real time, or when a predetermined condition is satisfied in order to update the screen position. The updated screen area information may be stored in the storage unit 250. For example, when the user views content in the HMT mode while the electronic device 220 is mounted on the wearable device 210, if the mounting position of the electronic device 220 is changed due to the external impact, a screen may be provided to conform to the changed mounting position through the update of the screen position by the screen area updating unit 244. Thus, in some embodiments, the position and/or size of the screen display area may be re-calculated in response to a signal from an accelerometer or another component of the electronic device indicating that the electronic device has experienced an external impact.

At least some of the functions of the controller 240 shown in FIG. 2 may be included in the area determination module 180 or the processor 120 of the electronic device 101 shown in FIG. 1. In addition, the touch screen 230 or the display panel 231 of FIG. 2 may correspond to the display 160 of FIG. 1. In addition, the storage unit 250 of FIG. 2 may correspond to the memory 130 shown in FIG. 1.

Although the display panel 231 and the touch panel 232 are illustrated as the touch screen 230 in FIG. 2, according to various embodiments of the present disclosure, the display panel 231 and the touch panel 232 may be separate from one another.

In addition, according to various embodiments of the present disclosure, for ease of explanation, the electronic device 220 may be referred to as a first device (or a first electronic device), and the wearable device 210 may be a second device (or a second electronic device).

In some embodiments, the electronic device may include: a display unit that includes a plurality of pixels, wherein one or more pixels among the plurality of pixels emit light according to a predetermined pattern; a communication unit that receives signals that are created in response to the light-emitting of the pixels from a wearable device while the one or more pixels emit light; and a controller that determines a screen display area corresponding to the wearable device, based on the positions of one or more pixels that emit light at the time when the signals are received from the wearable device.

According to various embodiments of the present disclosure, the controller may determine one or more reference points from the positions of one or more pixels that emit light at the time when the signals are received, and may determine the screen display area corresponding to the wearable device from the one or more reference points.

According to various embodiments of the present disclosure, the signals created in response to the light-emitting of the pixels may be signals that are created at the time when one or more light-receiving elements provided on the front side of the wearable device sense the light.

According to various embodiments of the present disclosure, the signals created in response to the light-emitting of the pixels may include information on the one or more light-receiving elements.

According to various embodiments of the present disclosure, the controller may configure a window corresponding to at least some area of the display unit, and may control one or more pixels that belong to the window area to emit light.

According to various embodiments of the present disclosure, the controller may control the configured window to move or vary according to a predetermined pattern.

In some embodiments, the electronic device may include: a display unit that has a plurality of light-emitting elements and a plurality of light-receiving elements, which are arranged thereon; and a controller that, when a screen display mode corresponding to a wearable device is executed, determines a screen display area corresponding to the wearable device, based on the positions of one or more light-receiving elements that sense the light among the plurality of light-receiving elements.

According to various embodiments of the present disclosure, the controller may determine one or more reference points from the positions of the sensed light-receiving elements, and may determine the screen display area corresponding to the wearable device from the one or more reference points.

According to various embodiments of the present disclosure, the one or more light-receiving elements may sense the light emitted by one or more light-emitting elements that are provided on the front side of the wearable device.

Figure 3:
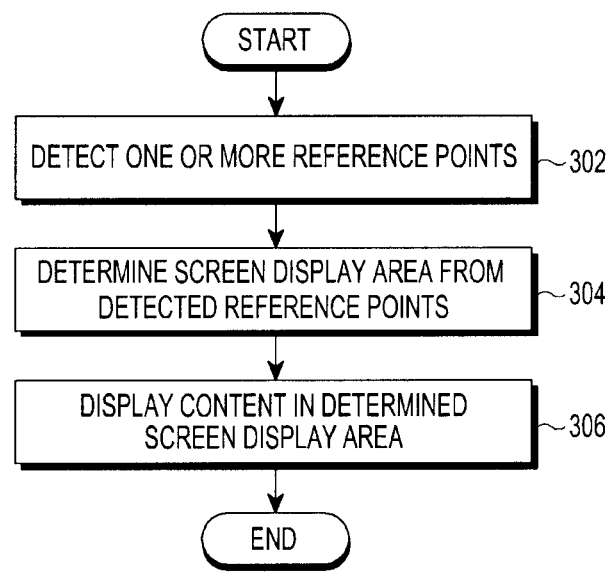
FIG. 3 is a flowchart of an example of a process, according to various embodiments of the present disclosure.

FIG. 3 is a flowchart of an example of a process, according to various embodiments of the present disclosure. According to the process, in operation 302, the first device (e.g., a smartphone that is used to provide a display function) is mounted on the second device (e.g., the wearable device), after which the first device detects one or more reference points by using light-emitting sensors or light-receiving sensors provided on the front side of the second device.

In operation 304, the first device may determine the position of a screen display area for use when the first device is in the HMT mode. The position may be determined based on the detected reference points. For example, according to various embodiments of the present disclosure, the electronic device may identify a first portion of the first device's display in which the first device would display images designated for the left eye of the user, and/or a second portion of the first device's display in which the first device would display images designated for the user's right eye.

In operation 306, the first device may display content in the determined screen display area when the first device is in the HMT mode. As indicated above, the content may include three-dimensional (3D) still images, or 3D video, and/or any other suitable type of virtual reality (VR) content.

Figure 4:
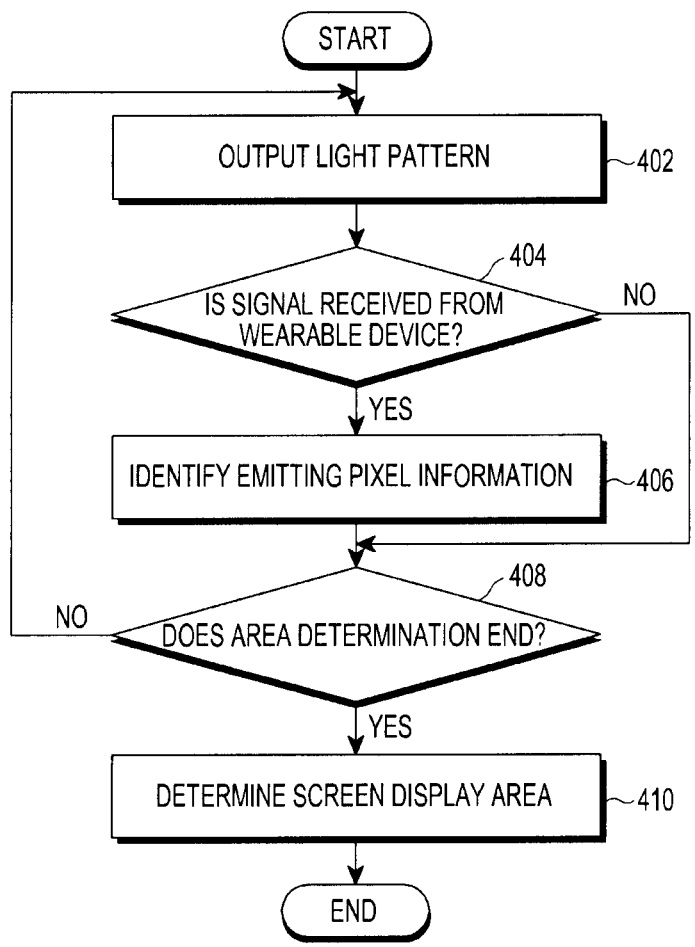
FIG. 4 is a flowchart of an example of a process, according to various embodiments of the present disclosure.

FIG. 4 is a flowchart of an example of a process, according to various embodiments of the present disclosure. According to the process, in operation 402, the electronic device is mounted on the wearable device, and in order to determine the screen display area for the HMT mode, the controller may control one or more pixels in the display unit, to emit light according to a predetermined pattern.

While the one or more pixels emit light, when signals that are created in response to the light-emitting of the pixels are received from the wearable device in operation 404, the electronic device may identify information associated with the one or more pixels that are used to emit the light pattern at the time when the signals are received from the wearable device in operation 406.

In operation 408, the electronic device may determine whether or not the area determination process should end. According to various embodiments of the disclosure, the area determination process may end when the light-emitting operation of the plurality of pixels according to the predetermined pattern is completed, or even before the completion of the light-emitting operation, when all of the desired signals are received from the wearable device (for example, when all of the signals necessary for the screen display area determination are received), the area determination process may be determined to be terminated. In addition, according to various embodiments of the present disclosure, if all of the desired signals are not received from the wearable device even after the completion of the light-emitting operation of the plurality of pixels, the light-emitting operation according to the predetermined pattern may be repeated.

If it is determined that the area determination process has ended in operation 408, in operation 410, the electronic device may determine a screen display area for the HMT mode from the pixel information obtained in operation 406. As discussed above, determining the screen display area may include one or more of: (1) identifying a first portion of the electronic device's display in which the electronic device would display images designated for the left eye of the user, and (2) identifying a second portion of the electronic device's display in which the first device would display images designated for the user's right eye. In some implementations, any of the first portion and the second portion may be identified based on the locations of the one or more pixels that are used to emit light, and/or one or more signals that are received from the wearable device when the wearable device senses the light.

One or more operations in FIG. 3 and FIG. 4 may be omitted, or one or more other operations may be added to the operations above. In addition, the operations of FIG. 3 and FIG. 4 may be performed according to a sequence shown in the drawings, or the sequence of one or more operations may be changed. In addition, the operations shown in FIG. 3 and FIG. 4 may be performed in the electronic device, or in the server. In addition, one or more operations shown in FIG. 3 and FIG. 4 may be performed in the electronic device, and the remaining operations may be performed in the server.

In some embodiments, the screen area control method of an electronic device may include: in a display unit of the electronic device, which includes a plurality of pixels, letting one or more pixels among the plurality of pixels emit light according to a predetermined pattern; receiving signals that are created in response to the light-emitting of the pixels from a wearable device while the one or more pixels emit light; and determining a screen display area corresponding to the wearable device, based on the positions of one or more pixels that emit light at the time when the signals are received from the wearable device.

According to various embodiments of the present disclosure, the method may further include: determining one or more reference points from the positions of one or more pixels that emit light at the time when the signals are received; and determining the screen display area corresponding to the wearable device from the one or more reference points.

According to various embodiments of the present disclosure, the signal created in response to the light-emitting of the pixels may be signals that are created at the time when one or more light-receiving elements provided on the front side of the wearable device sense the light.

According to various embodiments of the present disclosure, the signals created in response to the light-emitting of the pixels may include information on the one or more light-receiving elements.

According to various embodiments of the present disclosure, the method may further include: configuring a window corresponding to at least some area of the display unit; and controlling one or more pixels that belong to the window area to emit light.

According to various embodiments of the present disclosure, the method may further include controlling the configured window to move or vary according to a predetermined pattern.

In some embodiments, the screen area control method of an electronic device may include: executing a screen display mode corresponding to a wearable device; in a display unit that has a plurality of light-emitting elements and a plurality of light-receiving elements, which are arranged thereon, sensing light by one or more light-receiving elements among the plurality of light-receiving elements; and determining a screen display area corresponding to the wearable device, based on the positions of one or more light-receiving elements that sense the light among the plurality of light-receiving elements.

According to various embodiments of the present disclosure, the method may further include: determining one or more reference points from the positions of the sensed light-receiving elements; and determining the screen display area corresponding to the wearable device from the one or more reference points.

According to various embodiments of the present disclosure, the one or more light-receiving elements may sense the light emitted by one or more light-emitting elements that are provided on the front side of the wearable device.

Hereinafter, an example in which the electronic device (e.g., a smartphone) is mounted on the wearable device will be described with reference to FIG. 5A, FIG. 5B, and FIG. 6.

Figure 5A:
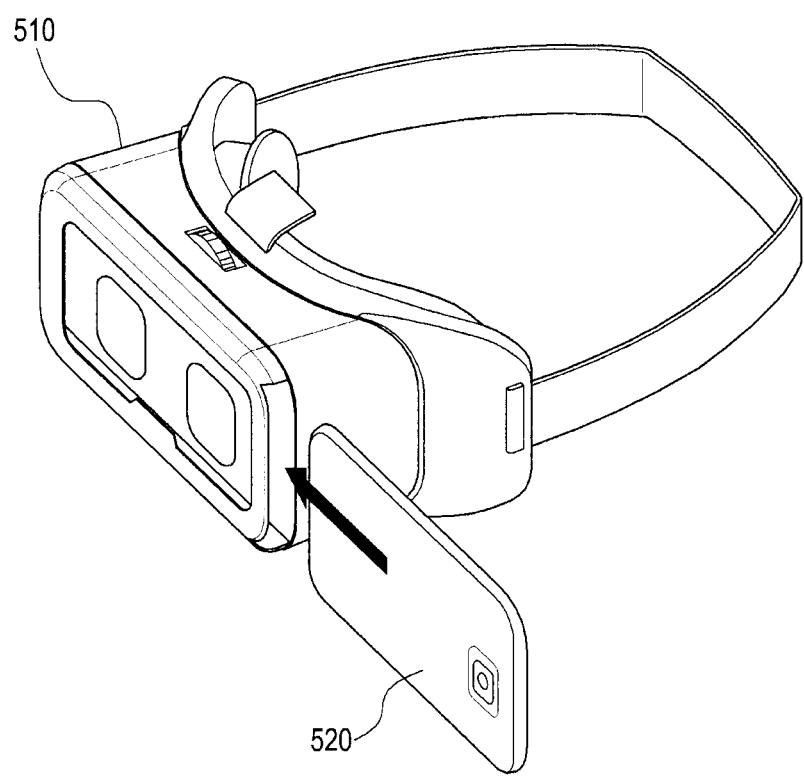
FIG. 5A illustrates an example in which an electronic device is mounted on a wearable device, according to various embodiments of the present disclosure.
Figure 5B:
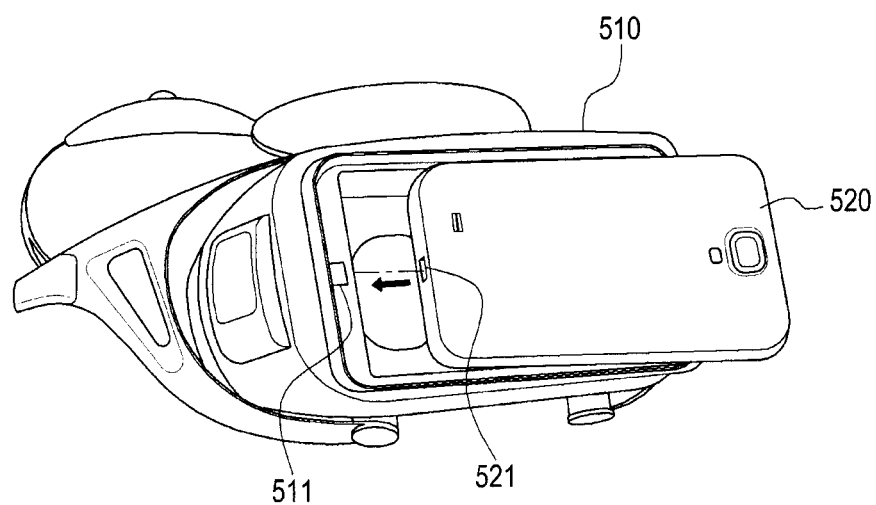
FIG. 5B illustrates an example in which an electronic device is mounted on a wearable device, according to various embodiments of the present disclosure.
Figure 6:
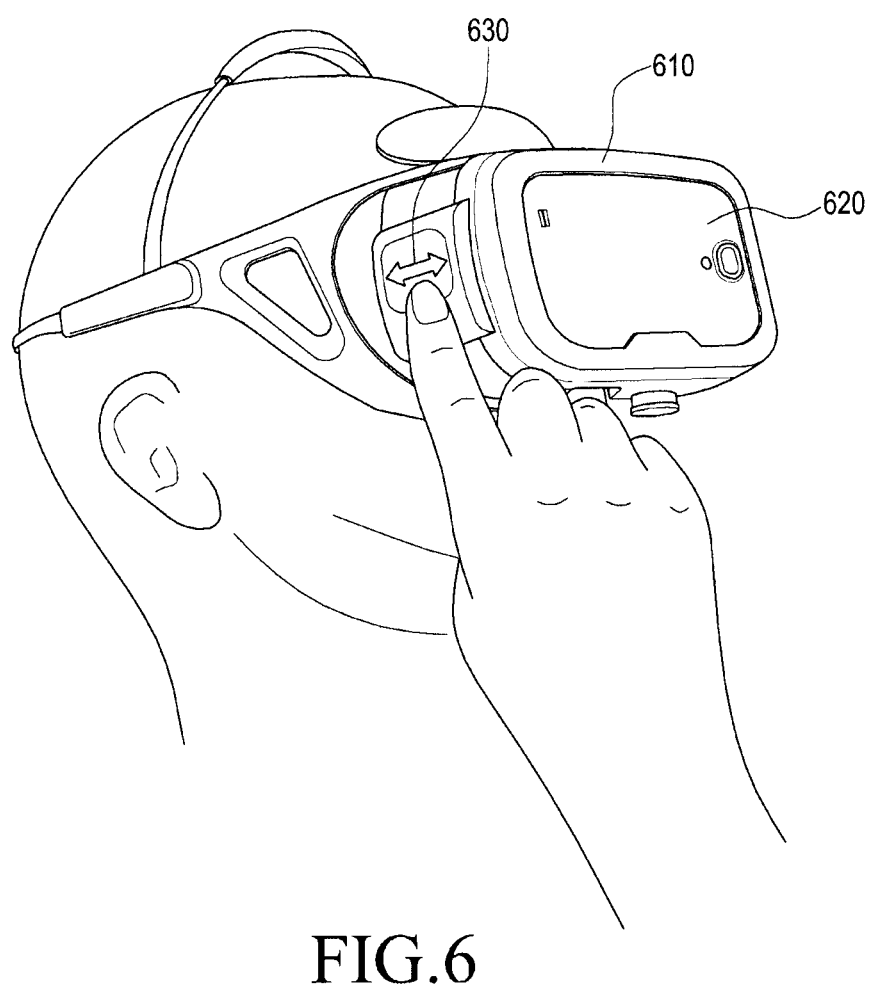
FIG. 6 illustrates an example of a user wearing a wearable device that has an electronic device mounted thereon, according to various embodiments of the present disclosure.

FIG. 5A and FIG. 5B illustrate examples in which an electronic device 520 (e.g., the first device) is mounted on a wearable device 510 (e.g., the second device), according to various embodiments of the present disclosure, and FIG. 6 illustrates an example of the user wearing a wearable device 610 that has an electronic device 620 mounted thereon, according to various embodiments of the present disclosure.

Referring to FIG. 5A and FIG. 5B, the wearable device 510, for example, may be the electronic device 102 of FIG. 1. In addition, as described above, in some implementations, the wearable device 510 may act only as a holder, and it may lack the ability to communicate with the electronic device 520. The wearable device 510 may include a body and a cover.

When the electronic device 520 is mounted on the wearable device 510, the cover may cover the rear edge of the electronic device 520 in order to hold the electronic device 520 in place. The wearable device 510 may have a strap that is used by the user to wear the wearable device 510 on the user's head.

In addition, the wearable device 510 may include lenses provided at positions corresponding to both eyes of the user, respectively. The wearer may view a screen of a display (not shown) of the electronic device 520 through the lenses when the electronic device 520 is mounted on the wearable device 510. Additionally or alternatively, the wearable device 510 may include one or more mechanical structures for detachably mounting the electronic device 520 onto the wearable device 510.

According to various embodiments of the present disclosure, the wearable device 510 may include one or more of the elements discussed with respect to the electronic device 101 of FIG. 1. For example, the wearable device 510 may include at least one of a touch panel, buttons, a wheel key, or a touch pad. The touch panel may receive a user's touch input. The touch input may be a direct touch input by the user, or may be a hovering input close to the touch panel. When the electronic device 520 is mounted on the wearable device 510, the wearable device 510 may be connected to the electronic device 520 through an interface, such as USB, in order to communicate with the same.

The electronic device 520 may perform various functions in response to the input received from the wearable device 510. For example, the electronic device 520 may adjust various sound and image characteristics (e.g., volume, bass, brightness, contrast, etc.) in response to the received input. For example, when the electronic device 520 is mounted on the wearable device 510, an external device connecting unit 521 of the electronic device 520 may be electrically connected with a connecting unit 511 of the wearable device 510 in order for the devices 510 and 520 to be able to communicate with each other. In addition, according to various embodiments of the present disclosure, when the electronic device 520 determines the screen display area for presenting content in the HMT mode, as described above, one or more pixels among a plurality of pixels, which constitute the display unit of the electronic device 520, emit light according to a predetermined pattern, and the light-receiving elements provided on the front side of the electronic device 510 sense the light, after which the electronic device 520 may transmit one or more signals through the connecting unit 511 which indicate that at least some of the light-receiving elements have sensed light emitted by the one or more pixels.

Referring to FIG. 6, the electronic device 620 may be the electronic device 101 of FIG. 1, and, for example, may be a smart phone that includes a display unit. The wearable device 610 may be the second electronic device 102 of FIG. 1, and may be a wearable mechanical holder.

The user may mount the electronic device 620 on the wearable device 610 such that the display unit (e.g., the touch screen) of the electronic device 620 is oriented towards the face of the user as shown in FIG. 6. The user may close the cover of the wearable device 610 in order to fix the electronic device 620 to the wearable device 610. As shown in FIG. 6, the user may wear the wearable device 610, on which the electronic device 620 is mounted, on the user's head. The user may view the screen of the display of the electronic device 620 through lenses provided in the wearable device 610.

In addition, as shown FIG. 6, the user may control the operation of the wearable device 610 or the electronic device 620 through a touch pad 630 that is provided on the side of the wearable device 610.

In some embodiments, the wearable device may include: one or more light-receiving elements that are provided on the side of the wearable device that faces a display unit of an electronic device; a controller that controls to create signals according to the sensing of the one or more light-receiving elements; and a communication unit that transmits the created signals to the electronic device.

In some embodiments, the wearable device may include: one or more light-emitting elements that are provided on at least a part of a side that faces a display unit of an electronic device; and when a screen display mode corresponding to the wearable device is executed, creating a control signal to control the light-emitting of the one or more light-emitting elements.

Figure 7:
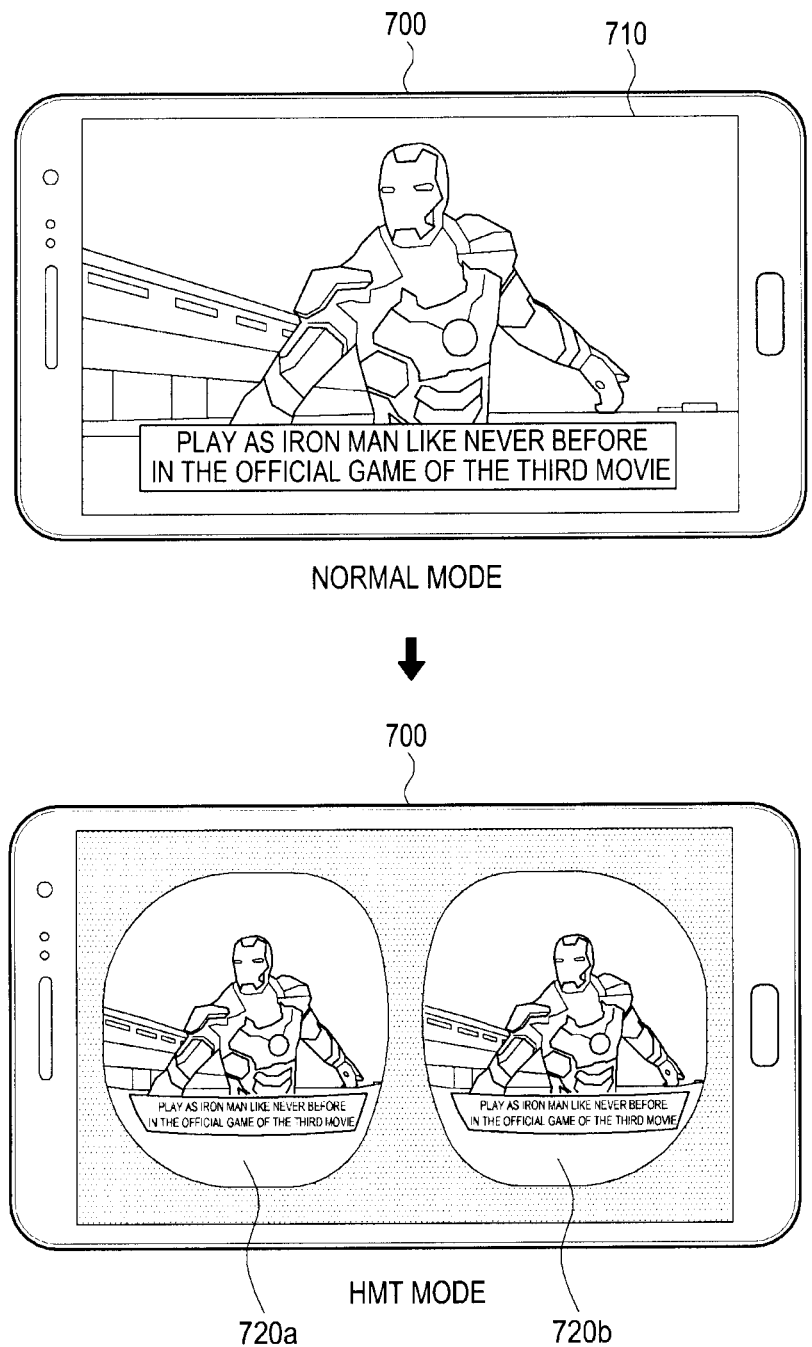
FIG. 7 is a diagram illustrating examples of different display modes of the electronic device, according to various embodiments of the present disclosure.

FIG. 7 is a diagram illustrating examples of different display modes of the electronic device, according to various embodiments of the present disclosure.

Referring to FIG. 7, the electronic device 700 may be the electronic device 520 and 620 in FIG. 5A, FIG. 5B, and FIG. 6. When the electronic device 700 operates in a normal mode, the electronic device may display a single screen 710 as shown in the upper diagram of FIG. 7.

According to various embodiments of the present disclosure, when the electronic device 700 is mounted on the wearable device, the electronic device may operate in the HMT mode as shown. When the electronic device 700 operates in the HMT mode, the electronic device may separately display a screen 720a corresponding to the left eye of the user and a screen 720b corresponding to the right eye of the user. In other words, in the HMT mode, the single screen which would be displayed in the normal mode, may be divided into two screens 720a and 720b in order to enable the user to view the single screen in 3D.

In various embodiments of the present disclosure, when the electronic device 700 is mounted on the wearable device to operate in the HMT mode, the electronic device may determine the positions of the screens 720a and 720b in the display unit of the electronic device 700 (hereinafter "display positions"). Hereinafter, various embodiments for determining the sizes or positions of the screens (the screen 720a corresponding to the left eye and the screen 720b corresponding to the right eye) in the HMT mode when the electronic device 700 is mounted on the wearable device to then operate in the HMT mode will be described with reference to FIGS. 8-17.

Figure 8:
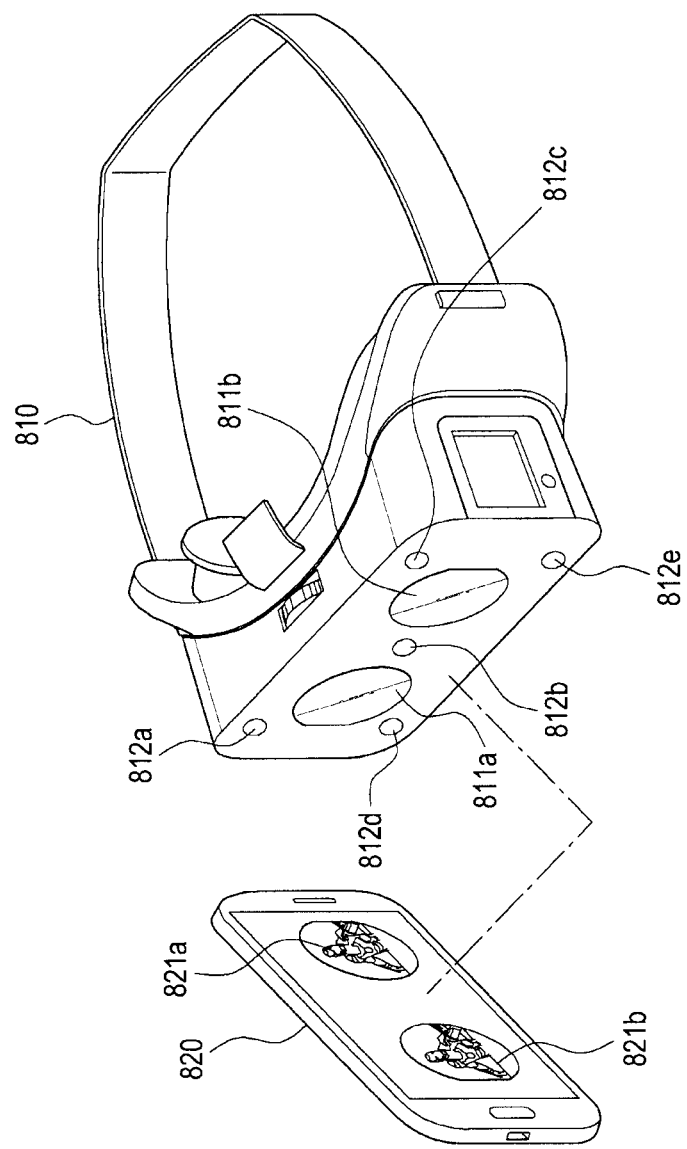
FIG. 8 is a diagram illustrating a method for detecting reference points in an electronic device, according to various embodiments of the present disclosure.

FIG. 8 is a diagram illustrating a method for detecting reference points in an electronic device, according to various embodiments of the present disclosure. As illustrated, when the electronic device 820 is mounted on the wearable device 810 to display two screens 821a and 821b in the HMT mode on the display unit of the electronic device 820, the electronic device may detect reference points from the wearable device 810 in order to determine the display positions of the screens 821a and 821b.

According to various embodiments of the present disclosure, the wearable device 810 may have one or more light-receiving elements 812a, 812b, 812c, and 812d provided on the front side (for example, a surface that faces the display unit of the electronic device 820) of the wearable device 810. The light-receiving elements 812 may be implemented by using photodiodes, avalanche photodiodes, or phototransistors, but the embodiments of the present disclosure are not limited thereto. Any element that can sense the light and can convert the same to an electric signal may be used for the light-receiving element 812, according to various embodiments of the present disclosure.

When the electronic device 820 is mounted on the wearable device 810 and the touch screen of the electronic device 820 faces the front side of the wearable device 810, according to various embodiments of the present disclosure, one or more pixels in the display unit of the electronic device 820 may emit light according to a predetermined light pattern. If the pixels are aligned with any of the light-receiving elements 812 of the wearable device 810, these light-receiving elements may sense the light that is emitted from the pixels. As the light-receiving elements 812 sense the light, the wearable device 810 may create electrical signals, and may transmit the created electrical signals to the electronic device 820. Afterwards, the electronic device 820 may identify the positions of one or more pixels that emit light when the signals are received from the wearable device 810 in order to determine the positions of the screens 821a and 821b on the display unit of the electronic device 810.

As discussed further below, while it is outputting the light pattern, the electronic device 820 may receive one or more signals from the wearable device 810 as feedback and determine the positions of the one or more light-receiving elements 812 provided in the wearable device 810 based on those signals. After identifying the positions of the light-receiving elements 812, the electronic device 820 may determine the screen display area corresponding to the wearable device 810 based on the determined positions. In other words, the light receiving elements may serve as reference points located at a known position relative to one or more of the lenses (or other openings) in the electronic device. Based on the reference points, the electronic device may determine where the lenses of the wearable device are located and display one or more images at positions on the display screen of the electronic device that are suitable for viewing through the lenses.

The light-receiving elements 812 may be implemented in various types, forms, positions, numbers, shapes, or patterns. As an example, FIG. 8 shows five light-receiving elements that are provided at the upper left portion 812a, the center 812*b*, the upper right portion 812*c*, the lower left portion 812*d*, and the lower right portion 812*e* of the front side of the wearable device 810.

The user who wears the wearable device 810 with the mounted electronic device 820 may view the screens 821*a* and 821*b* displayed on the display unit of the electronic device 820 through lenses 811*a* and 811*b* of the wearable device 810. According to various embodiments of the present disclosure, as described above, the screen position may be determined according to the mounting status of the electronic device 820 so that the screen may be displayed to conform to the positions of the user's eyes regardless of the size, the shape, the type, the mounting accuracy, or the mounting structure of the electronic device 820.

Figure 9:
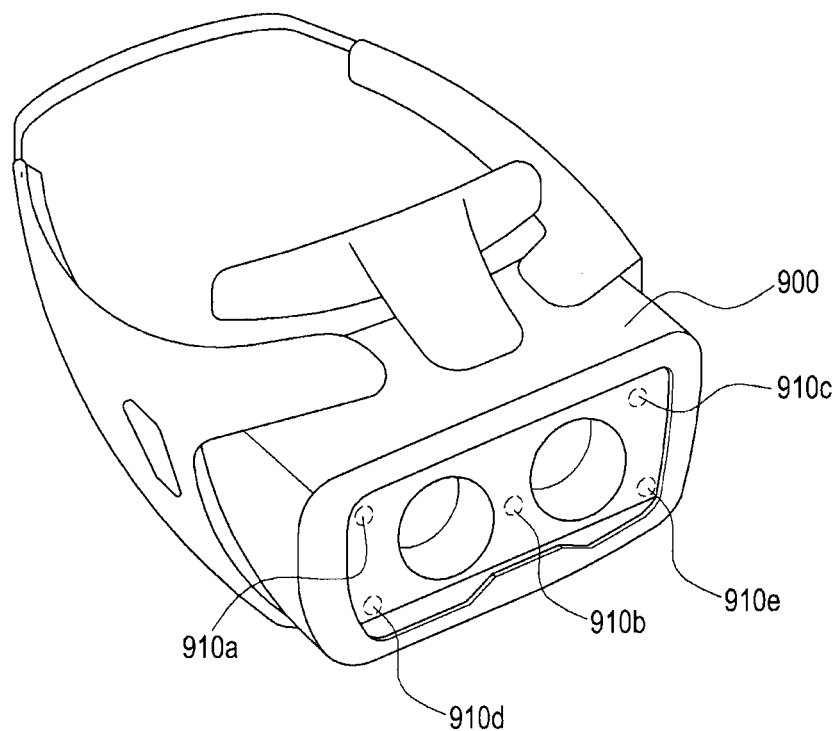
FIG. 9 is a diagram of an example of a wearable device, according to various embodiments of the present disclosure.

FIG. 9 is a diagram of an example of a wearable device, according to various embodiments of the present disclosure. Referring to FIG. 9, the light-receiving elements 910 may be disposed around the lens portion provided on the front side of the wearable device 900.

In some embodiments, the lens portion may include only two openings without there being any lenses disposed inside. For example, according to various embodiments of the present disclosure, the light-receiving elements may be arranged in a circle on the periphery of the openings. Although in the present example five light-receiving elements 910 are disposed around the lens portion in FIG. 9, any suitable number of light-receiving elements may be disposed around the lens portion. Furthermore, the light elements may be disposed at any suitable position on the surface of the wearable device.

Although the wearable device has the light-receiving elements disposed thereon, the wearable device may have the light-emitting elements disposed thereon as shown in the embodiments described later. The light-emitting elements may be provided on the wearable device in various positions, methods, or patterns as the light-receiving elements.

Figure 10:
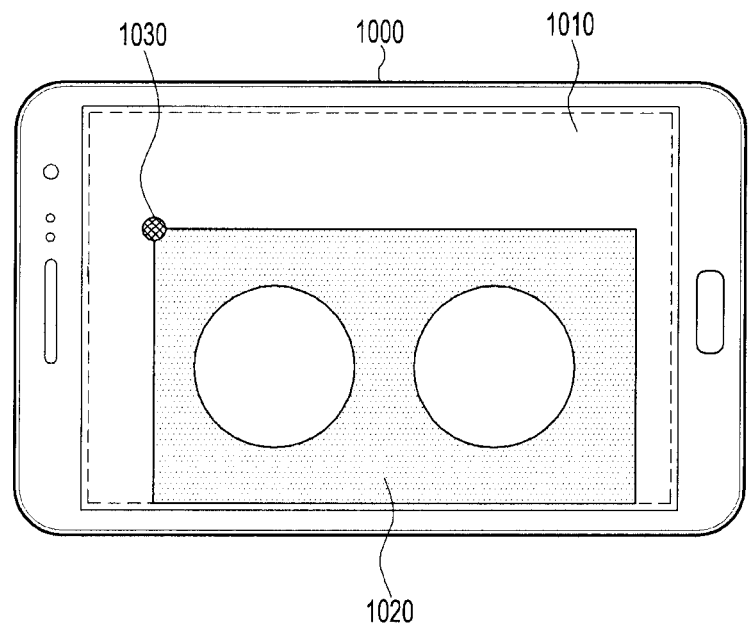
FIG. 10 is a diagram of an example of a screen display area, according to various embodiments of the present disclosure.
Figure 11:
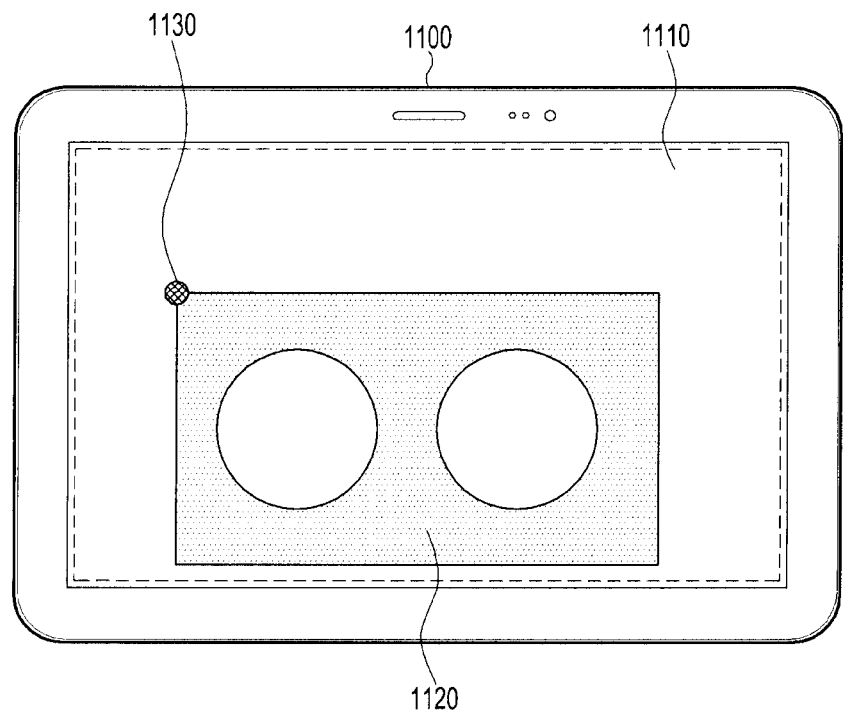
FIG. 11 is a diagram of an example of a screen display area, according to various embodiments of the present disclosure.

FIGS. 10 and 11 are diagrams of an example of a screen display area, according to various embodiments of embodiments of the present disclosure. Referring to FIG. 10 and FIG. 11, at least parts of the display units 1010 and 1110 of the electronic devices 1000 and 1100, respectively, may be designated as screen display areas 1020 and 1120 for the HMT mode.

The sizes and/or positions of the display areas 1020 and 1120 may be determined depending on the size and focal length of the lenses in the wearable device used to view content displayed on the electronic devices 1000 and 1100. As shown in FIG. 10 and FIG. 11, when the electronic devices 1000 and 1100, which have a larger screen size than a fixed screen size, are mounted on the wearable device, the display units 1010 and 1110 of the electronic devices should position the reference points 1030 and 1130 of the screens 1020 and 1120 at specific locations in order to conform to the dimensions of the wearable device.

Hereinafter, an embodiment for determining the screen display area or screen position corresponding to the HMT mode in the display unit of the electronic device, according to various embodiments of the present disclosure, will be described with reference to FIG. 12 to FIG. 17.

Figure 12:
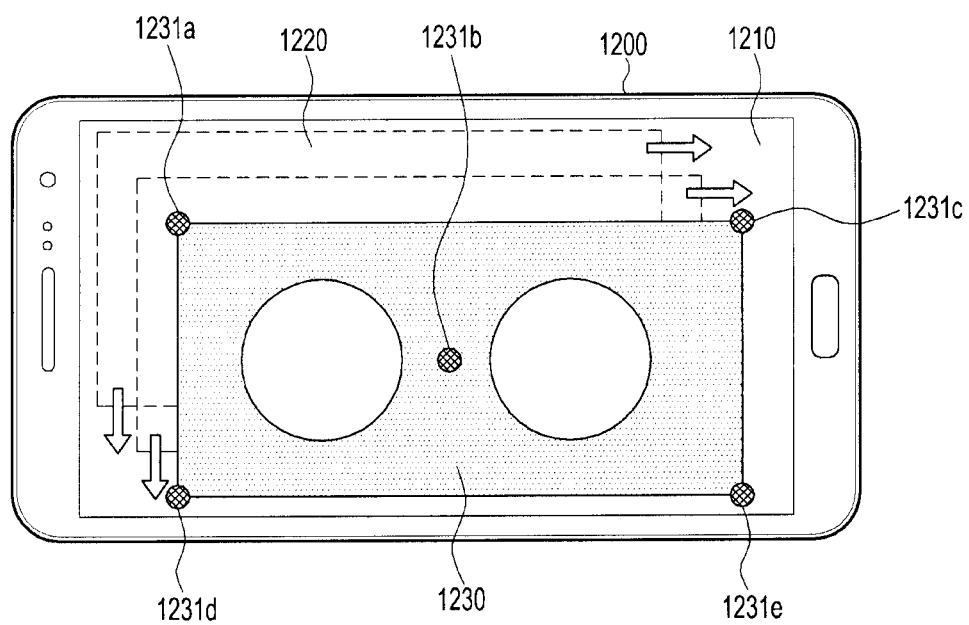
FIG. 12 is a diagram illustrating method for identifying a screen display area corresponding to a particular wearable device, according to various embodiments of the present disclosure.

FIG. 12 is a diagram illustrating method for identifying a screen display area corresponding to a particular wearable device, according to various embodiments of the present disclosure. Referring to FIG. 12, it is assumed that five light-receiving elements 1231*a*, 1231*b*, 1231*c*, 1231*d*, and 1231*e* are provided on the front side of the wearable device.

When the electronic device is mounted on the wearable device and arranged to operate in the HMT mode, the electronic device may determine a screen display area 1230 that corresponds to the HMT mode in the full screen 1210 of the electronic device.

For example, the electronic device may configure a window 1220 of a screen size corresponding to the HMT mode in the screen 1210 of the electronic device, and may allow pixels located in the area of the window 1220, to emit light. The window 1220, while remaining fixed in size, may move up, down, left, or right according to a predetermined pattern. As can be readily appreciated, moving the window 1220 may cause different pixels to emit light as some pixels may be left out of the window 1220 while others are brought in.

As the pixels corresponding to the window emit light, if one or more light-receiving elements 1231 of the wearable device are aligned with the window area, the light-receiving elements 1231 may sense light emitted by the pixels in the window area.

As illustrated in FIG. 12, when all of the light-receiving elements 1231 sense light emitted by the pixels in the window 1220, the wearable device may output one or more signals indicating that that window 1220 is aligned with the light-receiving elements 1231. Afterwards, in response to the one or more signals, the electronic device 1220 may select the window as a screen display area for presenting content while the electronic device is in the HMT mode.

Figure 13A:
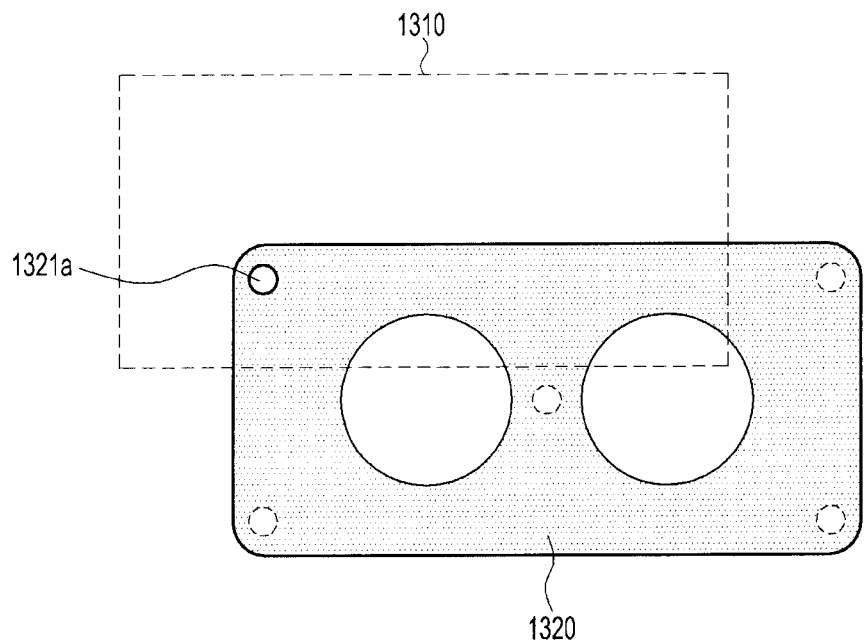
FIG. 13A is a diagram illustrating a method for identifying a screen display area corresponding to the wearable device, according to various embodiments of the present disclosure.
Figure 13B:
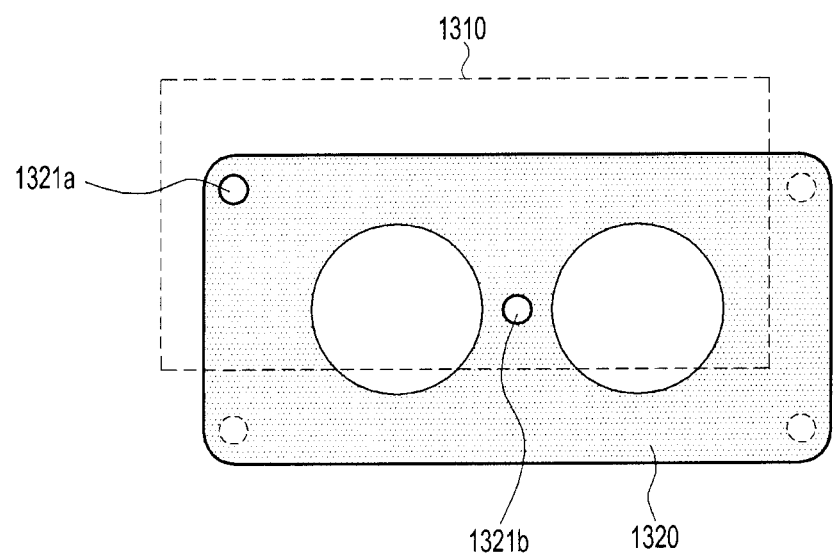
FIG. 13B is a diagram illustrating a method for identifying a screen display area corresponding to the wearable device, according to various embodiments of the present disclosure.
Figure 13C:
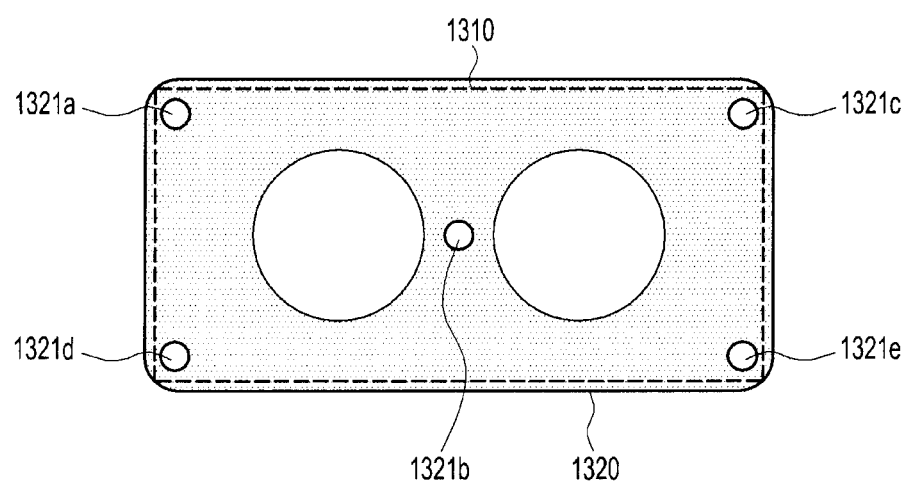
FIG. 13C is a diagram illustrating a method for identifying a screen display area corresponding to the wearable device, according to various embodiments of the present disclosure.

FIGS. 13A-C are diagrams illustrating a method for identifying a screen display area corresponding to the wearable device, according to various embodiments of the present disclosure. Referring to FIGS. 13A-C, as described in FIG. 12, one or more light-receiving elements 1321, which are provided in the wearable device, may sense light emitted by the pixels in the moving a window 1310. In this example, the window 310 may have a fixed size corresponding to the HMT mode.

For example, when the window 1310 is positioned as shown in FIG. 13A, only the light-receiving element 1321*a* in the upper left corner among a plurality of light-receiving elements may sense the light. In addition, if the window 1310 moves to the position as shown in FIG. 13B, only the light-receiving element 1321*a* in the upper left corner and the light-receiving element 1321*b* in the center among the plurality of light-receiving elements may sense the light.

In addition, if the window 1310 moves to the position as shown in FIG. 13C, all of the five light-receiving elements 1321*a*, 1321*b*, 1321*c*, 1321*d*, and 1321*e* may sense the light. When all of the five light-receiving elements sense the light, one or more signals may be transmitted from the wearable device 1320 to the electronic device. The signals may indicate that all (or a sufficient number of) light-receiving elements are aligned with the window 1310. Afterwards, the electronic device may select the position and/or size of the window 1310 at the time when the signals are received as the position and/or size of a screen display area in which content is to be displayed while the device is in the HMT mode.

Figure 14A:
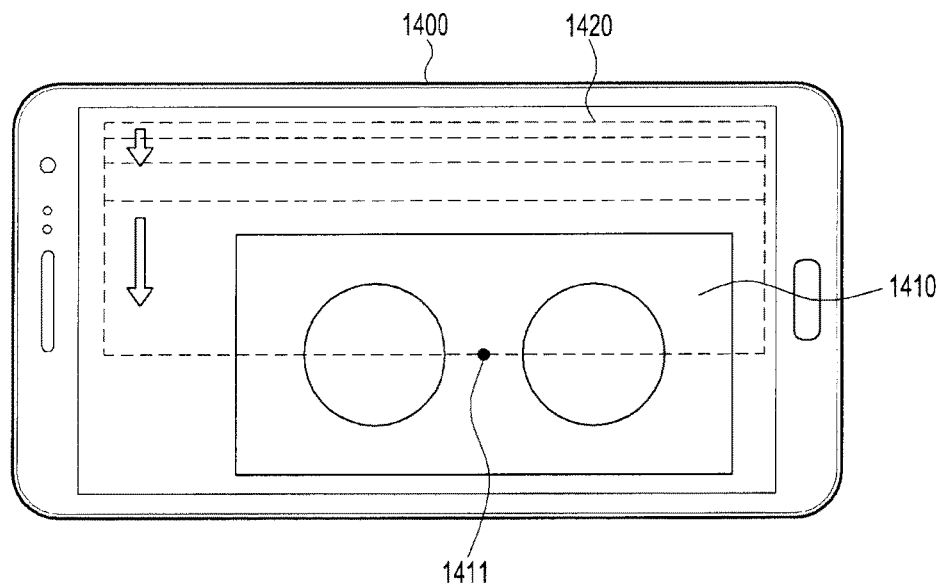
FIG. 14A is a diagram illustrating a method for identifying a screen display area corresponding to the wearable device, according to various embodiments of the present disclosure.
Figure 14B:
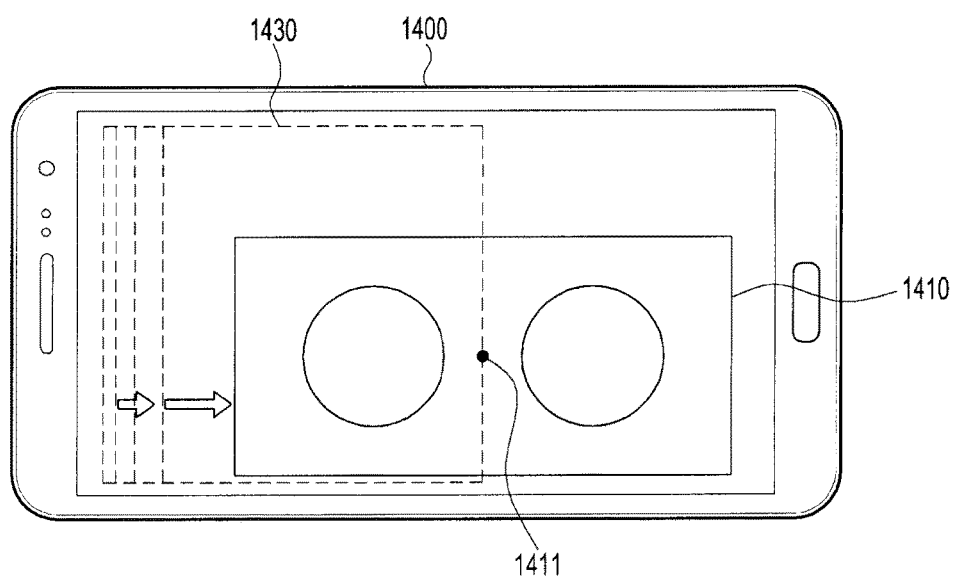
FIG. 14B is a diagram illustrating a method for identifying a screen display area corresponding to the wearable device, according to various embodiments of the present disclosure.
Figure 14C:
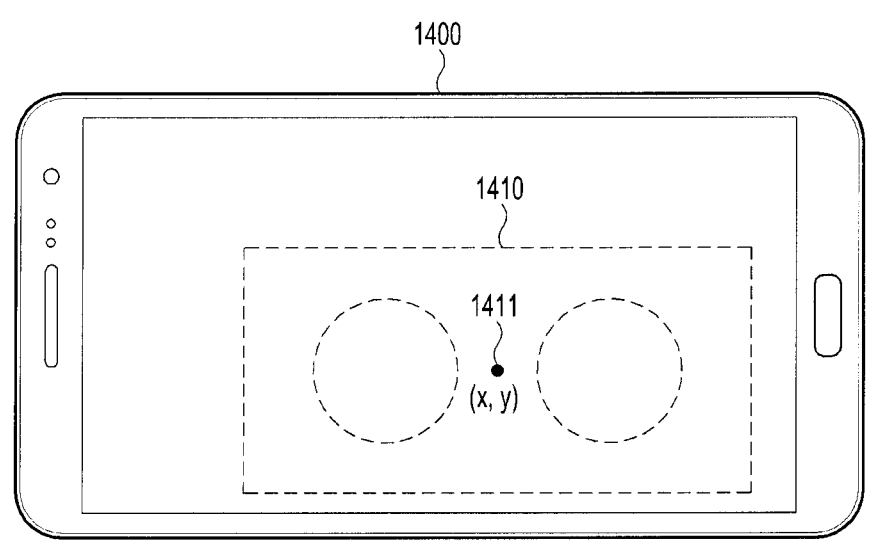
FIG. 14C is a diagram illustrating a method for identifying a screen display area corresponding to the wearable device, according to various embodiments of the present disclosure.

FIGS. 14A-C are diagrams illustrating a method for identifying a screen display area corresponding to the wearable device, according to various embodiments of the present disclosure. Referring to FIG. 14A, FIG. 14B, and FIG. 14C, the electronic device 1400 may vary the size and/or location of a window 1420 in which the pixels emit light in order to effectively determine the position of a screen display area in which content is to be displayed when the device is operated in HMT mode. It is assumed that a single light-receiving element is provided in the center of the front side of the wearable device in the embodiments of FIG. 14A, FIG. 14B, and FIG. 14C.

Referring to FIG. 14A, it is possible to increase the size of the window from the top of the full screen of the electronic device 1400. For example, at the beginning, the window 1410 may have a height equal to at least one pixel line. Then, the height of the window 1410 may be gradually increased downwards. Additionally or alternatively, in some implementations, the size of the window may be kept the same (e.g., at a minimum height of one pixel line), and the window may be moved from the top to the bottom.

As described above, if the size of the window is increased downwards or the window of a predetermined size (e.g., a window that has height of one or more pixel lines) is moved downwards to the position shown in FIG. 14A, the central light-receiving sensor 1411 may eventually sense the light that is emitted by the pixels in the window 1410. In response to sensing the light with the light-receiving sensor 1411, the wearable device may transmit a signal to the electronic device 1400 which indicates that the light has been sensed. The electronic device 1400 may identify the window at the time when the signal is received from the wearable device in order to obtain a y-coordinate of the position on the screen corresponding to the position of the light-receiving sensor 1411. According to the modification of the method of FIG. 14A, the y-coordinate may be obtained by extending or moving the window from the bottom to the top rather than from the top to the bottom as well.

Referring to FIG. 14B, the size of the window may be increased from left to right until the window covers the full screen of the electronic device 1400. For example, at the beginning, the window may be one pixel wide. Then, in some implementations, the width of the window may be gradually increased to the right. Additionally or alternatively, in some implementations, the size of the window may be kept the same and the window may be moved from the left to the right.

As described above, if the size of the window is increased to the right or the window of a predetermined size is moved to the right to the position shown in FIG. 14B, the central light-receiving sensor 1411 may sense light emitted from one or more pixels in the window. In response to sensing the light with the light-receiving sensor 1411, the wearable device may transmit a signal to the electronic device 1400 which indicates that the light has been sensed. The electronic device 1400 may identify the window at the time when the signal is received from the wearable device in order to obtain an x-coordinate of the position on the screen corresponding to the position of the light-receiving sensor 1411. According to the modification of the method of FIG. 14B, the x-coordinate may be obtained by extending or moving the window from right to left rather than from left to right as well.

Referring to FIG. 14C, the coordinates (x, y) for the position on the screen corresponding to the position of the light-receiving sensor 1411 may be obtained according to the procedure of FIG. 14A and FIG. 14B, and the screen display area 1410 corresponding to the HMT mode may be determined in the full screen of the electronic device 1400 according to a predetermined screen size in the HMT mode and the screen display area corresponding to the left eye and/or right eye.

FIGS. 15A-E are diagrams illustrating a method for identifying a screen display area corresponding to the wearable device, according to various embodiments of the present disclosure. Referring to FIGS. 15A-E, a window 1520 may be created having a minimum unit size. The window 1520 may be created in the center of the electronic device 1500, and afterwards it may be determined whether or not light-receiving elements 1511 sense the light while increasing the size of the window 1520 in order to determine the position of a screen display area for presenting content while the device is in the HMT mode.

It may be assumed that light-receiving elements 1511a, 1511b, 1511c, and 1511d are disposed in the upper, lower, left, and right portions on the front side of the wearable device, respectively, in the embodiment of FIGS. 15A-E.

Figure 15A:
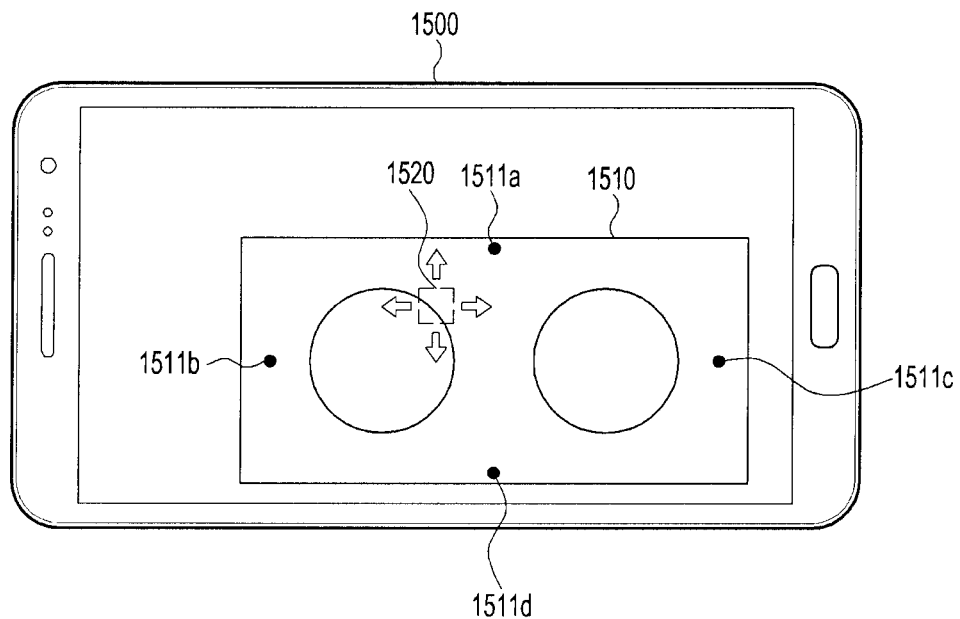
FIG. 15A is a diagram illustrating a method for identifying a screen display area corresponding to the wearable device, according to various embodiments of the present disclosure.

Referring to FIG. 15A, the window 1520 may, at first, have a minimum unit size in the center of the electronic device 1500. Then, the size of the window 1520 may be increased.

Figure 15B:
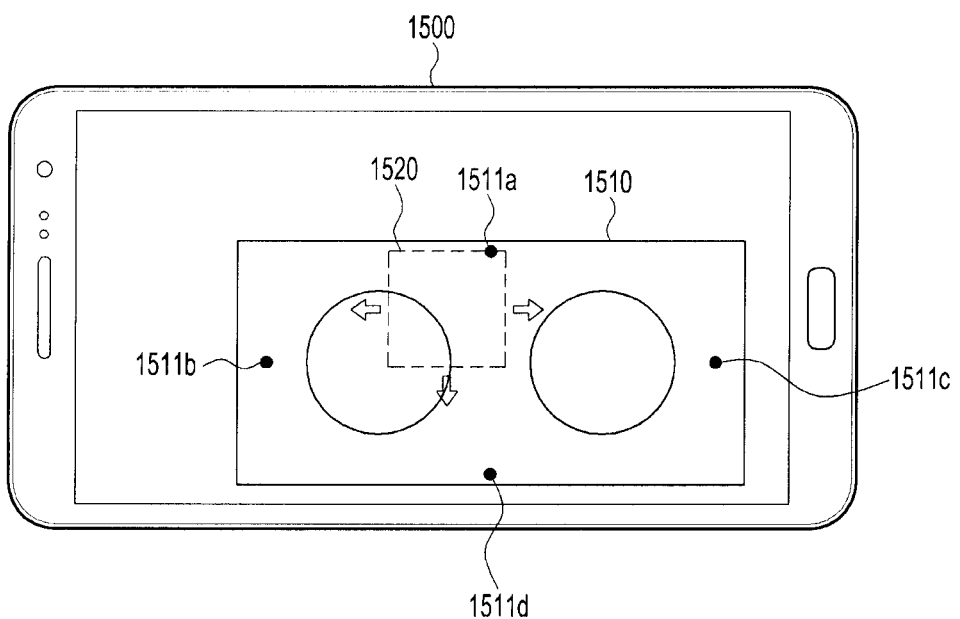
FIG. 15B is a diagram illustrating a method for identifying a screen display area corresponding to the wearable device, according to various embodiments of the present disclosure.

As the size of the window 1520 increases, when the upper light-receiving element 1511a is aligned with the area of the window 1520 as shown in FIG. 15B, the upper light-receiving element 1511a may sense the light emitted from one or more pixels in the window 1520. In response to sensing light with the upper light-receiving element 1511a, the wearable device may transmit a signal to the electronic device 1500 indicating that the light has been sensed. The electronic device 1500 may receive the signal from the wearable device, and it may continue to increase the size of the window 1520 while fixing the position of the upper side of the window.

Figure 15C:
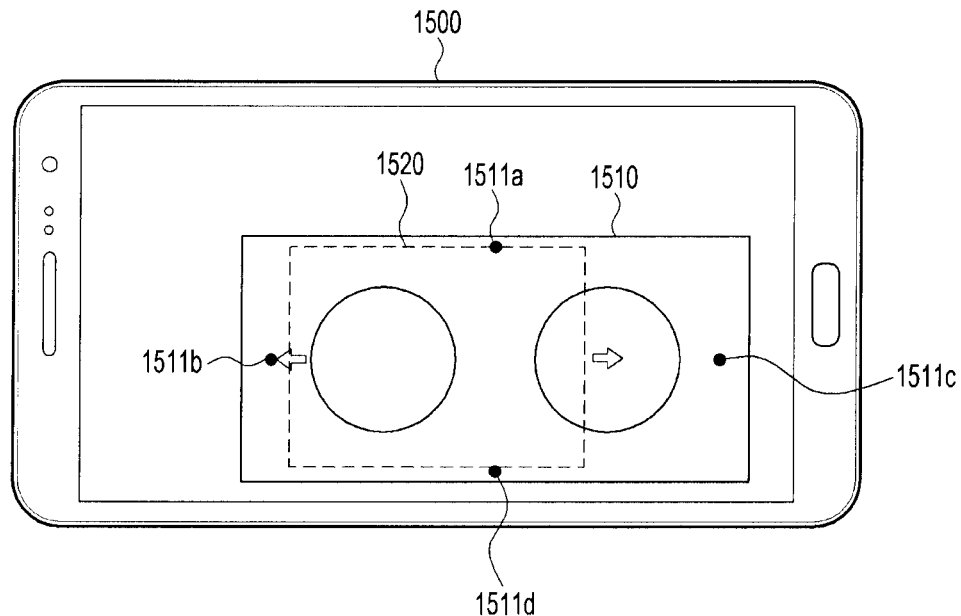
FIG. 15C is a diagram illustrating a method for identifying a screen display area corresponding to the wearable device, according to various embodiments of the present disclosure.

Referring to FIG. 15C, the left side, the right side, and the lower side of the window 1520 may be extended while the upper side is held fixed in place. Thus, in some implementations, the window may be expanded in a first direction until a signal is received indicating that a given light-receiving element has sensed light emitted from one or more pixels in the window. Afterwards, in response to the signal, the electronic device may stop expanding the window in the first direction and begin expanding the window in one or more other directions.

As the size of the window 1520 increases, when the lower light-receiving element 1511d becomes aligned the window 1520 as shown in FIG. 15C, the lower light-receiving element 1511d may sense the light in addition to the upper light-receiving element 1511a. In response to sensing light from one or more pixels in the window with the lower light-receiving element 1511d, the wearable device may transmit a signal to the electronic device 1500. The electronic device 1500 may receive the signal from the wearable device, and may continue to increase the size of the window 1520 while fixing the positions of the upper and lower sides of the window. For example, the electronic device may continue to increase the window in the left and right directions.

Figure 15D:
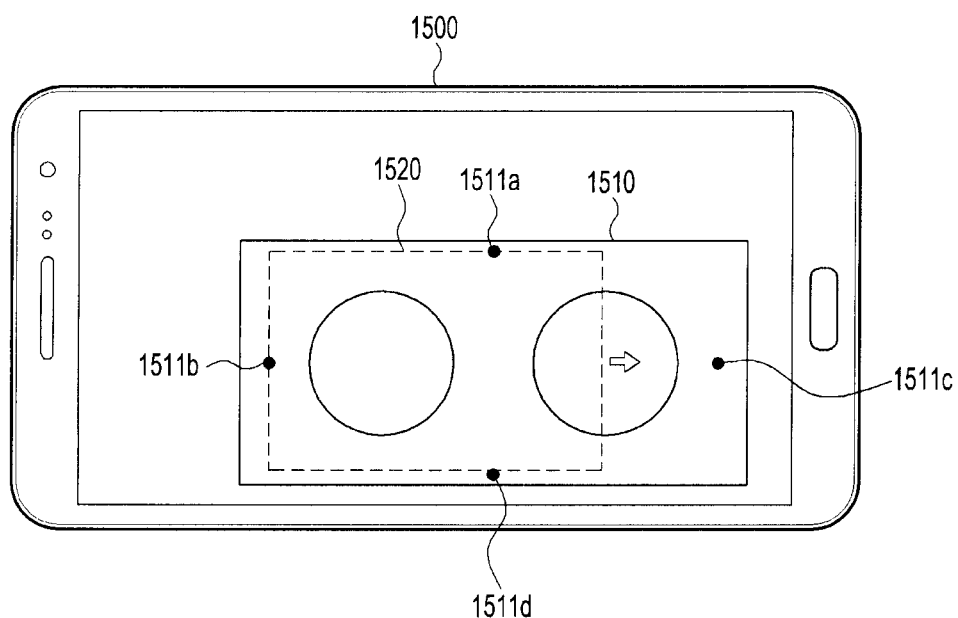
FIG. 15D is a diagram illustrating a method for identifying a screen display area corresponding to the wearable device, according to various embodiments of the present disclosure.

As the size of the window 1520 increases, when the left light-receiving element 1511b becomes aligned with the window 1520 as shown in FIG. 15D, the left light-receiving element 1511b may sense light emitted from one or more pixels in the window, in addition to the upper light-receiving element 1511a and the lower light-receiving element 1511d. In response to sensing light with the left light-receiving element 1511b, the wearable device may transmit a signal to the electronic device 1500 indicating that the light-receiving element 1511 has sensed light emitted from one or more pixels in the window. The electronic device 1500 may receive the signal from the wearable device, and may continue to increase the size of the window 1520 while fixing the positions of the upper, the lower, and the left sides of the window. For example, the electronic device may continue to expand the window to the right.

Figure 15E:
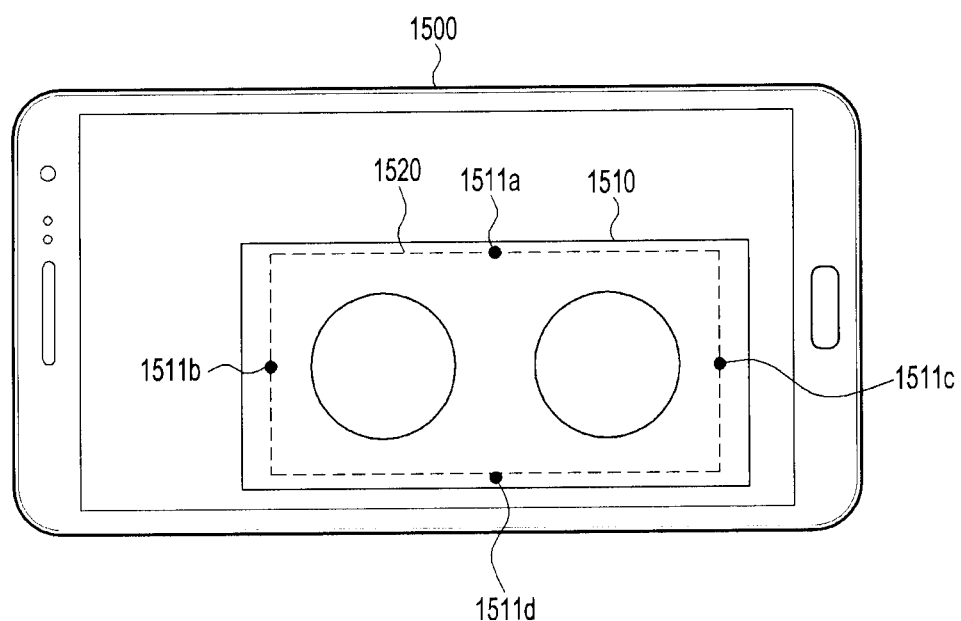
FIG. 15E is a diagram illustrating a method for identifying a screen display area corresponding to the wearable device, according to various embodiments of the present disclosure.

As the size of the window 1520 increases, when the right light-receiving element 1511c becomes aligned with the window 1520 as shown in FIG. 15E, the right light-receiving element 1511c may sense light emitted from one or more pixels in the window in addition to the upper light-receiving element 1511*a*, the lower light-receiving element 1511*d*, and the left light-receiving element 1511*b*. In response to sensing light with the light-receiving element 1511*c*, the wearable device may transmit a signal to the electronic device 1500.

In response to receiving this signal (e.g., a signal indicating that that window has been aligned with the light receiving elements 1511 in all four directions), The electronic device 1500 may select the window 1520, which is formed at the time when all of the signals corresponding to the sensing of the upper, lower, left, and right light-receiving elements are received from the wearable device as a screen display area for displaying content when the electronic device 1500 is in the HMT mode.

Figure 16:
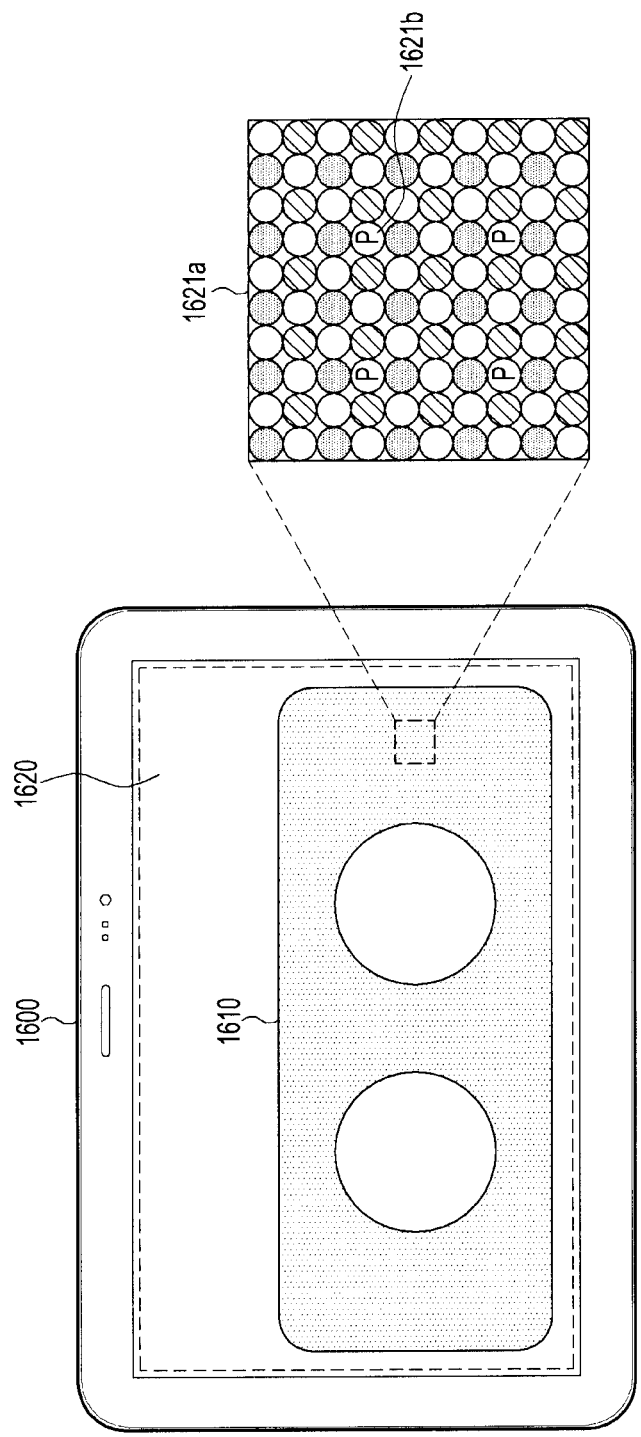
FIG. 16 is a diagram of an example of an electronic device, according to various embodiments of the present disclosure.

FIG. 16 is a diagram of an example of an electronic device, according to various embodiments of the present disclosure. As illustrated, light-receiving elements 1621*b* may be disposed between the pixels in the display unit 1620 of the electronic device 1600 and used to identify the screen display area 1610.

For example, the display unit 1620 may have a plurality of pixels 1621*a* corresponding to colors {for example, red (R), green (G), and blue (B)} depending on the displaying method, and may control the light-emitting of the pixels corresponding to each color in order to display images.

According to various embodiments of the present disclosure, one or more light-receiving elements 1621*b* may be disposed between the plurality of color pixels 1621*a*, according to a predetermined pattern.

Figure 17:
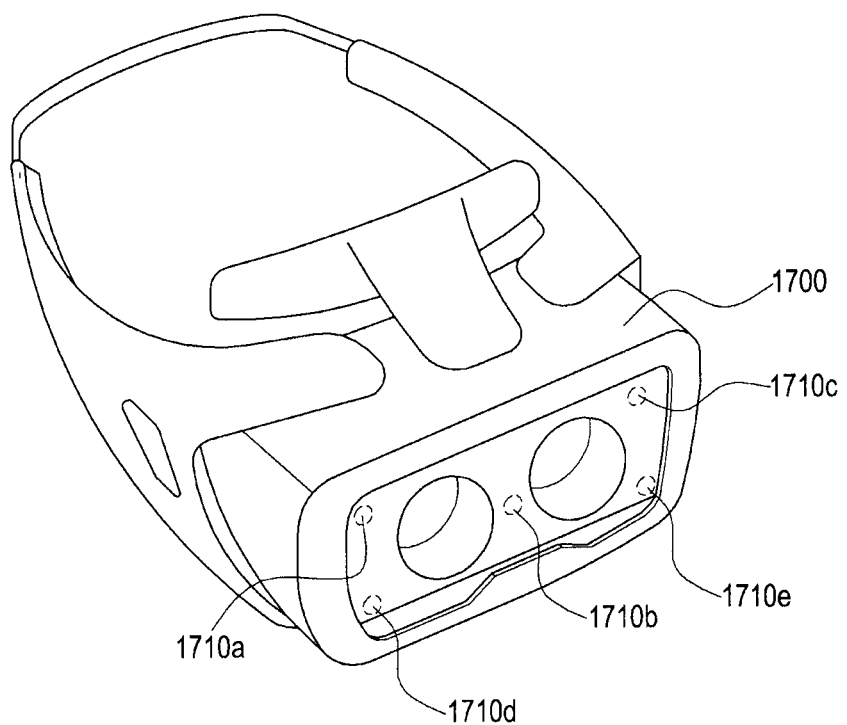
FIG. 17 is a diagram of an example of a wearable device, according to various embodiments of the present disclosure.

FIG. 17 is a diagram of an example of a wearable device, according to various embodiments of the present disclosure. As illustrated, the light-emitting elements 1710 may be disposed around the lens portion that is provided on the front side of the wearable device 1700.

According to various embodiments, the lens portion may include an opening in which lenses may be disposed. For example, according to various embodiments of the present disclosure, the light-emitting elements may be disposed in a circular form on the periphery of the openings. Although five light-emitting elements 1710 are disposed around the lens portion in FIG. 17, a plurality of light-emitting elements may be disposed around the lens portion, or may be disposed in a specific area.

According to various embodiments of the present disclosure, when the electronic device 1600 is mounted on the wearable device 1700 and one or more light-emitting elements 1710 provided on the front side of the wearable device 1700 emit light, the light-receiving element 1621*b* corresponding to the position of the light-emitting element 1710, among a plurality of light-receiving elements 1621*b* that are disposed in the display unit 1620 of the electronic device 1600, may sense the light. Afterwards, the electronic device may determine the screen display area for the HMT mode based on the positions of the light-receiving elements 1621*b* (the reference point), which have sensed the light, among the plurality of light-receiving elements 1621*b*.

Figure 18:
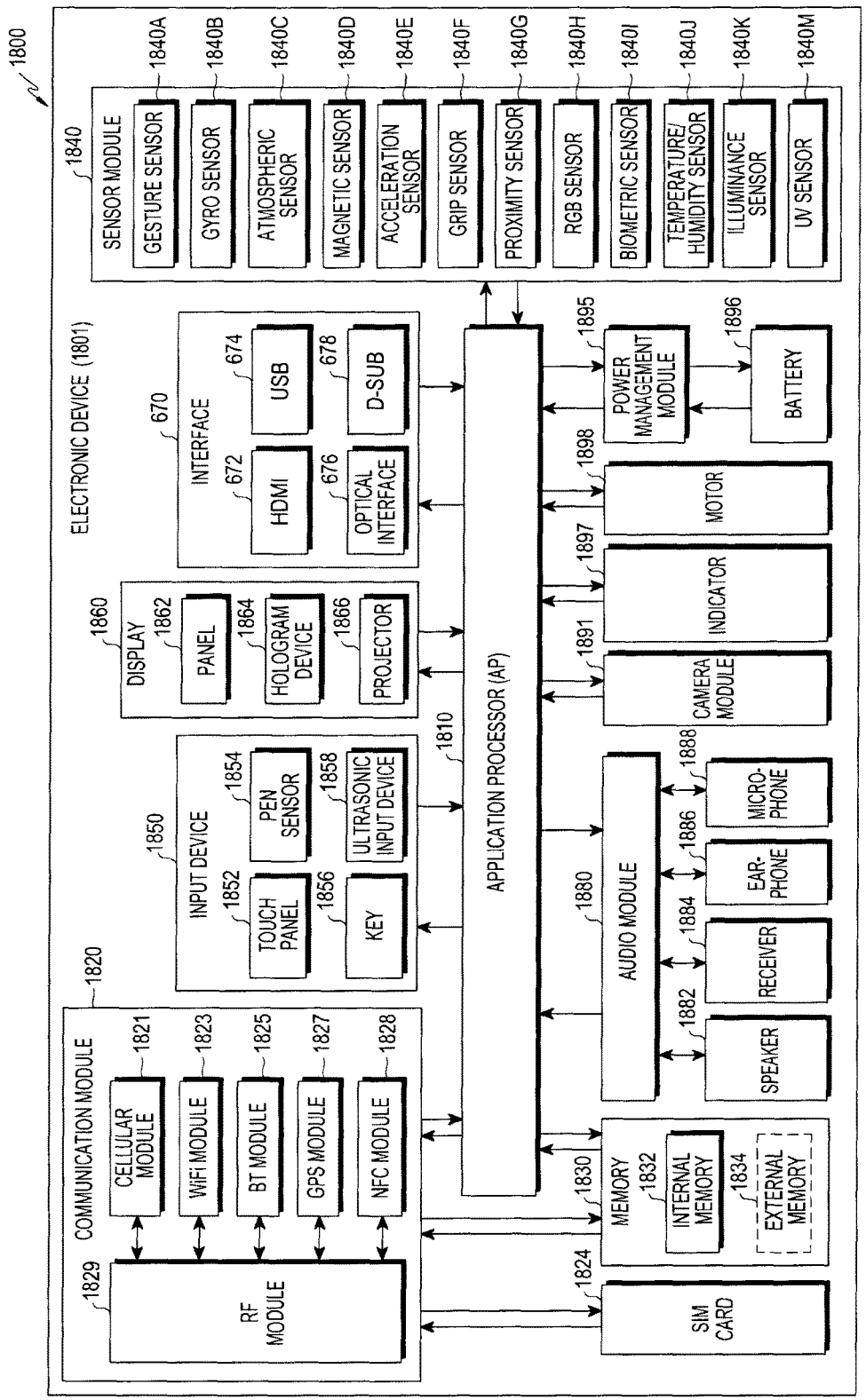
FIG. 18 is a block diagram of an example of an electronic device, according to various embodiments of the present disclosure.
Figure 19:
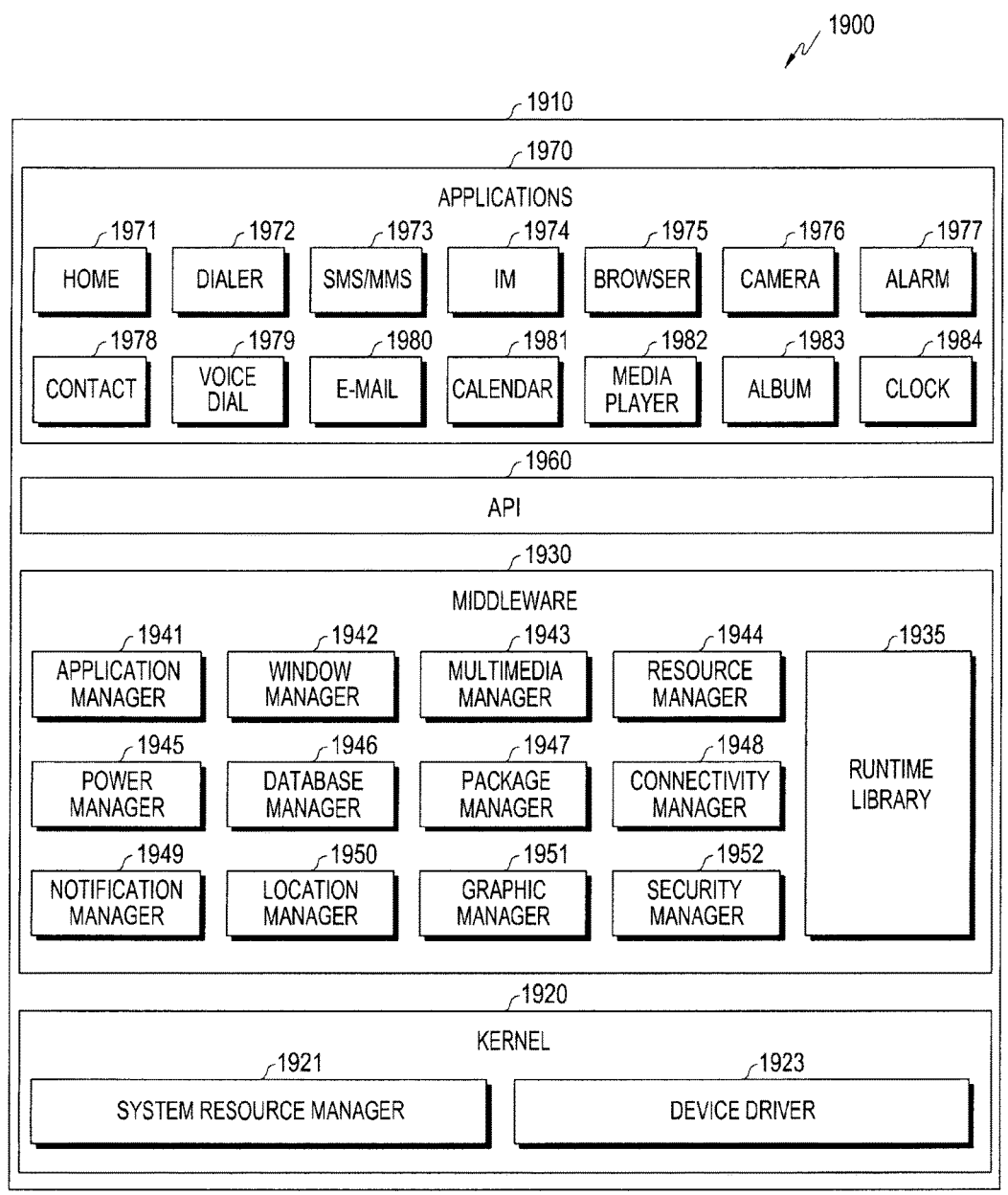
FIG. 19 is a block diagram of an example of a program module, according to various embodiments of the present disclosure.
Figure 20:
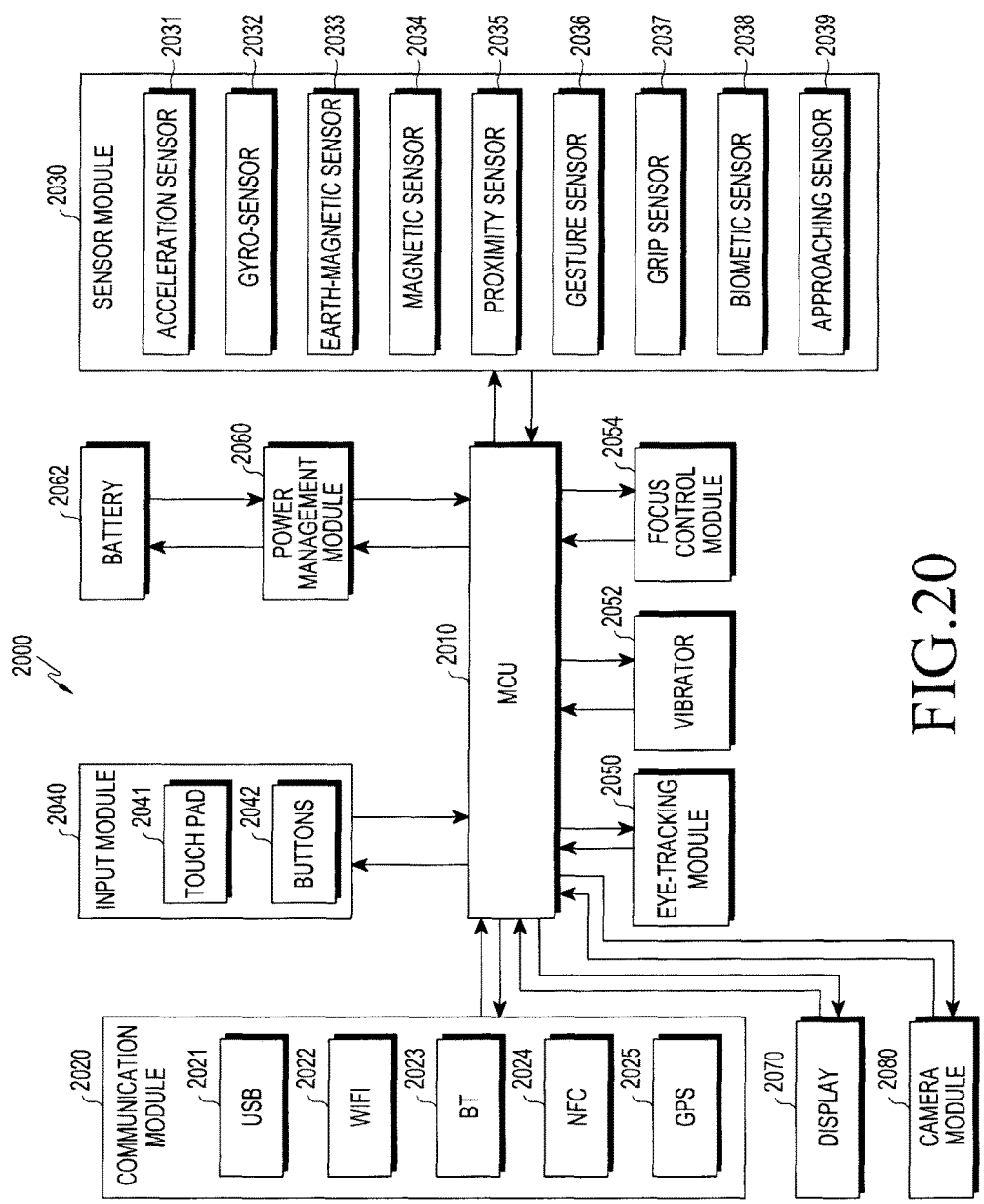
FIG. 20 is a block diagram of an example of a wearable device, according to various embodiments of the present disclosure.

Hereinafter, the example of implementing the first device (e.g., the electronic device) or the second device (e.g., the wearable device) will be described with reference to FIG. 18 to FIG. 20. FIG. 18 and FIG. 19 show an example of the electronic device that operates as a display device, and FIG. 20 shows an example of the wearable device.

FIG. 18 is a block diagram 1800 of an example of an electronic device 1801, according to an embodiment of the present disclosure. The electronic device 1801 may constitute a part or all of the electronic device 101 shown in FIG. 1. The electronic device 1801 may include one or more application processors (AP) 1810, a communication module 1820, a subscriber identification module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810, for example, may control a multitude of hardware or software elements connected with the AP 1810 and may perform data processing and calculation, by executing an operating system or application programs. The AP 1810 may be implemented by, for example, system on chips (SoC). According to an embodiment, the AP 1810 may further include a graphic processing unit (GPU) and/or an image signal processor. The AP 1810 may include at least some of the elements (e.g., a cellular module 1821) shown in FIG. 18. The AP 1810 may load instructions or data received from one or more other elements (e.g., non-volatile memories) in the volatile memory to then be processed, and may store a variety of data in non-volatile memories.

The communication module 1820 may have the identical or similar elements to the communication interface 170 of FIG. 1. The communication module 1820, for example, may include a cellular module 1821, a Wi-Fi module 1823, a BT module 1825, a GPS module 1827, an NFC module 1828, and a radio frequency (RF) module 1829.

The cellular module 1821, for example, may provide services of voice calls, video calls, and text messaging, or an Internet service through communication networks. According to an embodiment, the cellular module 1821 may perform identification and authentication of the electronic device 1801 in the communication network by using a subscriber identification module (e.g., the SIM card 1824). According to an embodiment, the cellular module 1821 may perform at least some of the functions provided by the AP 1810. According to an embodiment, the cellular module 1821 may include a communication processor (CP).

Each of the Wi-Fi module 1823, the BT module 1825, the GPS module 1827, or the NFC module 1828 may include a processor for processing data transmitted and received through the corresponding module. According to an embodiment, at least some (e.g., more than two) of the cellular module 1821, the Wi-Fi module 1823, the BT module 1825, the GPS module 1827, or the NFC module 1828 may be contained in a single integrated chip (IC) or an IC package.

The RF module 1829, for example, may transmit and receive communication signals (e.g., RF signals). The RF module 1829 may include, for example, a transceiver, a power amp module (PAM), a frequency filter, a low noise amplifier (LNA), antennas, or the like. According to another embodiment, at least one of the cellular module 1821, the Wi-Fi module 1823, the BT module 1825, the GPS module 1827, or the NFC module 1828 may transmit and receive the RF signals through separated RF modules.

The SIM card 1824 may include a card adopting a subscriber identification module, and/or embedded SIM, and may include inherent identification information {e.g., an integrated circuit card identifier (ICCID)} or subscriber information {e.g., an international mobile subscriber identity (IMSI)}.

The memory 1830, for example, may include an internal memory 1832 or an external memory 1834. The internal memory 1832 may include at least one of volatile memories {e.g., a dynamic RAM (DRAM), a static RAM (SRAM), a synchronous dynamic RAM (SDRAM), or the like}, or non-volatile memories {e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, a solid state drive (SSD), or the like}.

The external memory 1834 may further include a flash drive, for example, a compact flash (CF), a secure digital (SD), a micro secure digital (Micro-SD), a mini secure digital (Mini-SD), an extreme digital (xD), a memory stick, or the like. The external memory 1834 may be functionally and/or physically connected to the electronic device 1801 through various interfaces.

The sensor module 1840, for example, may measure physical quantities and may detect an operation state of the electronic device 1801, to convert the measured or detected information to electric signals. The sensor module 1840 may include at least one of, for example, a gesture sensor 1840A, a gyro-sensor 1840B, an atmospheric sensor 1840C, a magnetic sensor 1840D, an acceleration sensor 1840E, a grip sensor 1840F, a proximity sensor 1840G, a color sensor 1840H {e.g., a red-green-blue (RGB) sensor}, a biometric sensor 1840I, a temperature/humidity sensor 1840J, an illuminance sensor 1840K, or an ultraviolet (UV) sensor 1840M. Alternatively or additionally, the sensor module 1840 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1840 may further include a control circuit for controlling at least one sensor included therein. In some cases, the electronic device 1801 may further include a processor that is configured to control the sensor module 1840, as a part of the AP 1810 or separately from the same, in order to control the sensor module 1840 while the AP 1810 are in a sleep mode.

The input device 1850, for example, may include a touch panel 1852, a (digital) pen sensor 1854, keys 1856, or an ultrasonic input device 1858. The touch panel 1852 may use at least one of, for example, a capacitive type, a pressure-sensitive type, an infrared type, or an ultrasonic type. In addition, the touch panel 1852 may further include a control circuit. The touch panel 1852 may further include a tactile layer in order to provide a user with a tactile reaction.

The (digital) pen sensor 1854 may be implemented by using, for example, by using the same hardware that is used to detect touch input or by using a separate recognition sheet. The keys 1856 may include, for example, physical buttons, optical keys, or a keypad. The ultrasonic input device 1858 detects acoustic waves with a microphone (e.g., a microphone 1888) in the electronic device 1801 through an input means that generates ultrasonic signals to identify data.

The display 1860 (e.g., the display 160) may include a panel 1862, a hologram device 1864, or a projector 1866. The panel 1862 may include the identical or similar elements as the display 160 of FIG. 1. The panel 1862 may be implemented to be, for example, flexible, transparent or wearable. The panel 1862 may be configured with the touch panel 1852 as a single module. The hologram device 1864 may display 3D images in the air by using interference of light. The projector 1866 may display images by projecting light onto a screen. The screen may be positioned, for example, inside or outside the electronic device 1801. According to an embodiment, the display 1860 may further include a control circuit for controlling the panel 1862, the hologram device 1864, or the projector 1866.

The interface 1870 may include, for example, a high-definition multimedia interface (HDMI) 1872, a universal serial bus (UBS) 1874, an optical interface 1876, or a D-subminiature (D-sub) 1878. The interface 1870 may be included in, for example, the communication interface 170 shown in FIG. 1. Additionally or alternatively, the interface 1870 may include, for example, a mobile high-definition link (MHL) interface, a secure digital (SD) card/multi-media card (MMC) interface or an infrared data association (IrDA) standard interface.

The audio module 1880 may convert a sound into an electric signal, and vice versa. At least some elements of the audio module 1880 may be included, for example, in the input/output interface 150 shown in FIG. 1. For example, the audio module 1880 may process voice information input or output through a speaker 1882, a receiver 1884, earphones 1886 or a microphone 1888.

The camera module 1891 is a device for photographing still and moving images, and, according to an embodiment of the present disclosure, it may include at least one image sensor (e.g., a front sensor or a rear sensor), lenses, an image signal processor (ISP), or a flash (e.g., LED or a xenon lamp).

The power control module 1895 may manage the power of the electronic device 1801. According to an embodiment, the power management module 1895 may include a power management integrated circuit (PMIC), a charger integrated circuit (IC), or a battery or fuel gauge. The PMIC may use a wired charging type and/or a wireless charging type. The wireless charging type may encompass, for example, a magnetic resonance type, a magnetic induction type, or an electromagnetic wave type, and may include additional circuits for wireless charging, such as coil loops, resonance circuits, rectifiers, or the like. The battery gauge may measure, for example, the remaining power of the battery 1896, a charging voltage and current, or temperature. The battery 1896 may include, for example, a rechargeable battery or a solar battery.

The indicator 1897 may display a specific state, for example, a booting state, a message state or a charging state of the whole or a part (e.g., the AP 1810) of the electronic device 1801. The motor 1898 may convert electric signals to a mechanical vibration, and may generate a vibration effect or a haptic effect. Although it is not shown in the drawings, the electronic device 1801 may include a processing device (e.g., a GPU) for supporting mobile TV. The processing device for supporting the mobile TV may process media data according to the standard such as, for example, digital multimedia broadcasting (DMB), digital video broadcasting (DVB) or media flow.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

FIG. 19 is a block diagram 1900 of an example of a program module 1910, according to various embodiments of the present disclosure. According to an embodiment, the program module 1910 (e.g., the programs 140) may include an operating system (OS) that controls resources related to the electronic device (e.g., the electronic device 101), and/or various applications (e.g., application programs 147) which are executed under the OS. The OS may be, for example, Android, iOS, Windows, Symbian, Tizen, Bada, or the like.

The program module 1910 may include a kernel 1920, middleware 1930, an API (application programming interface) 1960, and/or applications 1970. At least some of the program module 1910 may be pre-loaded in the electronic device, or may be downloaded from a server (e.g., the server 106).

The kernel 1920 (e.g., the kernel 141 of FIG. 1), for example, may include a system resource manager 1921 or a device driver 1923. The system resource manager 1921 may perform a control, allocation, or collection of system resources. According to an embodiment, the system resource manager 1921 may include a process managing unit, a memory managing unit, or a file system managing unit. The device driver 1923, for example, may include a display driver, a camera driver, a Bluetooth driver, a shared memory driver, a USB driver, a keypad driver, a Wi-Fi driver, an audio driver, or inter-process communication (IPC) driver.

The middleware 1930, for example, may provide common functions necessary for the applications 1970, or may provide the applications 1970 with various functions through the API 1960 in order for the applications 1970 to effectively use limited system resources inside the electronic device. According to an embodiment, the middleware 1930 (e.g., the middleware 143) may include at least one of a run-time library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, or a security manager 1952.

The run-time library 1935, for example, may include a library module that a compiler uses in order to add new functions through programming language while the applications 1970 are executed. The run-time library 1935 may perform functions of the input/output management, the memory management, or arithmetic calculation.

The application manager 1941 may manage a life cycle of at least one of the applications 1970. The window manager 1942 may manage a GUI resource used in a screen. The multimedia manager 1943 may recognize formats that are necessary for the reproduction of various media files, and may perform encoding or decoding of the media files using codecs corresponding to the formats. The resource manager 1944 may manage resources such as a source code of one or more applications 1970, memories, or storages.

The power manager 1945 may manage a battery or a power source in association with a basic input/output system (BIOS), and may provide power information necessary for the operation of the electronic device. The database manager 1946 may create, search, or change a database used in one or more applications 1970. The package manager 1947 may manage the installation or update of the application distributed in the form of a package file.

The connectivity manager 1948, for example, may manage a wireless connection of Wi-Fi or Bluetooth. The notification manager 1949 may display or notify of events, such as received messages, appointments, or proximity notifications, in a manner that does not disturb a user. The location manager 1950 may manage location information of the electronic device. The graphic manager 1951 may manage graphic effects to be provided to a user and interfaces related thereto. The security manager 1952 may provide general security functions necessary for system security or user authentication. According to an embodiment, in the case where the electronic device (e.g., the electronic device 101) adopts a phone call function, the middleware 1930 may further include a telephony manager to manage a voice or video phone call function of the electronic device.

The middleware 1930 may include a middleware module comprised of a combination of various functions of the above-described elements. The middleware 1930 may provide modules that are specialized according to the type of operating system in order to provide differentiated functions. In addition, the middleware may dynamically exclude some of the existing elements, or may further include new elements.

The API 1960 (e.g., the API 145), which is a group of API programming functions, may be provided to have a different configuration according to operating systems. For example, in the case of Android or iOS, a single API set may be provided for each platform. In the case of Tizen, two or more API sets may be provided.

The applications 1970 (e.g., the application programs 147), for example, may include at least one of a home application 1971, a dialer application 1972, a short message server (SMS)/multi-media message service (MMS) application 1973, an instant message (IM) application 1974, a browser application 1975, a camera application 1976, an alarm application 1977, a contact list application 1978, a voice dial application 1979, an e-mail application 1980, a calendar application 1981, a media player application 1982, an album application 1983, a clock application 1984, a healthcare application (e.g., for measuring the amount of exercise or blood glucose), or an environmental information providing application (e.g., providing atmospheric pressure information, humidity information, or temperature information).

According to an embodiment, the applications 1970 may include an application (hereinafter, referred to as "information-exchange application" for convenience of explanation) that supports the exchange of information between the electronic device (e.g., the electronic device 101) and external electronic devices (e.g., the electronic device 102 or 104). The information-exchange application may include, for example, a notification relay application for relaying specific information to the external electronic devices, or a device management application for managing the external electronic devices.

For example, the notification relay application may include a function of transferring notification information created in other applications (e.g., the SMS/MMS application, the e-mail application, the healthcare application, or the environmental information application) of the electronic device to external electronic devices (e.g., the electronic devices 102 and 104). In addition, the notification relay application, for example, may receive the notification information from the external electronic devices in order to provide the same to the user. The device management application, for example, may manage (e.g., install, delete, or update) at least some functions {e.g., turning external electronic device (or some elements) on or off, or adjusting the brightness (or resolution) of a display} of the external electronic device (e.g., the electronic device 104) that communicates with the electronic device 101, applications executed in the external electronic device, or services (e.g., a phone call service, or a messaging service) provided by the external electronic device.

According to an embodiment, the applications 1970 may include applications (e.g., the healthcare application), which are designated according to the properties (e.g., the type of electronic device, such as a mobile medical device) of the external electronic device (e.g., the electronic device 102 or 104). According to an embodiment, the applications 1970 may include applications that are received from the external electronic devices (e.g., the electronic device 102 or 104, or the server 106). According to an embodiment, the applications 1970 may include preloaded applications or third party applications that can be downloaded from the servers. The names of the elements of the program module 1910, according to the illustrated embodiment, may vary according to the type of operating system.

According to various embodiments, at least some of the program module 1910 may be implemented by software, firmware, hardware, or a combination thereof. At least some of the program module 1910, for example, may be implemented (e.g., executed) by a processor (e.g., the AP 1810). At least some of the program module 1910, for example, may include modules, programs, routines, sets of instructions, or processes for performing one or more functions.

FIG. 20 is a block diagram of an example of a wearable device 2000, according to various embodiments of the present disclosure.

Referring to FIG. 20, the wearable device 2000 may provide the wearer with the identical or similar functions to the electronic device, independently from the display device that is mounted thereon. The wearable device 2000 may include an MCU 2010, a communication module 2020, a sensor module 2030, an input module 2040, an eye-tracking module 2050, a vibrator 2052, a focus control module 2054, a power management module 2060, a battery 2062, a display 2070, and a camera 2080.

The MCU 2010 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc.

The communications module 2020, for example, may include a USB module 2021, a WiFi module 2022, a BT module 2023, an NFC module 2024, or a GPS module 2025.

The sensor module 2030, for example, may include an acceleration sensor 2031, a gyro sensor 2032, an earth-magnetic sensor 2033, a magnetic sensor 2034, a proximity sensor 2035, a gesture sensor 2036, a grip sensor 2037, a biometric sensor 2038, or an approaching sensor 2039.

The input module 2040 may include a touch pad 2041, or buttons 2042.

The wearable device 2000 may include a display 2070 that is fixed to the body of the wearable device instead of the electronic device (e.g., the display device) that is mounted on, or detached from, the wearable device. The display 2070 may be provided in the body in order to provide the screen through the lens portion shown in FIG. 4 to FIG. 9 instead of the mountable electronic device display. The display 2070 may display the screen according to the AR operation or the see-through operation, according to various embodiments of the present disclosure. The camera 2080, for example, may be installed on the front side of the body to take front images of the wearer.

The wearable device 2000 may provide the wearer with an identical or similar AR operation or see-through operation to the electronic device independently from the mounted electronic device.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

FIGS. 1-20 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

As used throughout the disclosure, the term screen display area may refer to an area in the display of an electronic device where one or more screens are to be displayed when the electronic device is operated in HMT mode. Although in the above examples two screens (e.g., the screens 821*a* and 821*b*) can be displayed in a given screen display area, in some implementations the screen display area may be used to display only one screen. In such instances, two different screen display areas may be determined independently from one another, when the electronic device is used to present 3D content.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. An electronic device comprising:
   a display unit;
   a memory; and
   at least one processor operatively coupled to the memory, configured to:
   display a screen including a predetermined pattern by using pixels of the display unit;
   receive a signal indicating that the displayed screen has been sensed in an external device from the external device including light-receiving elements, when the displayed screen is sensed by a predetermined number of at least one light-receiving element from among the light-receiving elements of the external device; and
   identify a screen display area based at least in part on at least one position of at least one pixel which is emitted in the screen from among the pixels at time when the signal is received.

2. The electronic device of claim 1, wherein:
   the at least one processor is further configured to identify at least one reference point of the at least one pixel based on the at least one position, and
   the screen display area is identified based on the at least one reference point.

3. The electronic device of claim 1, wherein the signal is transmitted in response to at least one light-receiving element provided on a front side of the external device sensing light emitted by the at least one pixel.

4. The electronic device of claim 3, wherein the signal includes information associated with the at least one light-receiving element.

5. The electronic device of claim 1, wherein the at least one processor is further configured to identify a window corresponding to at least a portion of the display unit, the window including the at least one pixel.

6. The electronic device of claim 5, wherein the at least one processor is further configured to move or change a size of the window based on information included in the signal.

7. A method comprising:
   displaying, by an electronic device, a screen including a predetermined pattern by using pixels of a display unit;
   receiving, by the electronic device, a signal indicating that the displayed screen has been sensed in an external device from the external device including light-receiving elements, when the displayed screen is sensed by a predetermined number of at least one light-receiving element from among the light-receiving elements of the external device; and
   identifying, by the electronic device, a screen display area based at least in part on at least one position of at least one pixel which is emitted in the screen from among the pixels at time when the signal is received.

8. The method of claim 7, further comprising:
   identifying at least one reference point of the at least one pixels based on the at least one position,
   wherein the screen display area is identified based on the at least one reference point.

9. The method of claim 7, wherein at least one signal are transmitted in response to at least one light-receiving element provided on a front side of the external device sensing light emitted by the at least one pixel.

10. The method of claim 9, wherein the signals include information associated with at least one light-receiving element.

11. The method of claim 7, further comprising, identifying a window corresponding to at least a portion of the display unit, the window including the at least one pixel.

12. The method of claim 11, further comprising at least one of:
   moving the window based on information included in the signal; and
   resizing the window based on information included in the signal.

13. An external device comprising:
   a memory;
   a communication unit;
   light-receiving elements arranged on a side of the external device to face a display unit of an electronic device which is externally connected with the external device;
   at least one processor operatively coupled to the memory, the communication unit, and the light-receiving elements, configured to:
   detect, by the light-receiving elements, a screen including a predetermined pattern which emitted from the display unit of the electronic device;
   determine at least one light-receiving element which senses the screen from among the light-receiving elements; and
   transmit, via the communication unit, a signal including information indicating the screen has been sensed in the external device using a predetermined number of the at least one light-receiving element, to the electronic device.

* * * * *